(12) United States Patent
Kato et al.

(10) Patent No.: US 8,666,003 B2
(45) Date of Patent: Mar. 4, 2014

(54) RECEPTION DEVICE, RECEPTION METHOD, AND RECEPTION PROGRAM

(75) Inventors: Katsuya Kato, Osaka (JP); Takashi Yoshimoto, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/509,532

(22) PCT Filed: Aug. 11, 2010

(86) PCT No.: PCT/JP2010/063632
§ 371 (c)(1),
(2), (4) Date: May 11, 2012

(87) PCT Pub. No.: WO2011/058798
PCT Pub. Date: May 19, 2011

(65) Prior Publication Data
US 2012/0230445 A1 Sep. 13, 2012

(30) Foreign Application Priority Data

Nov. 13, 2009 (JP) ................................ P2009-259931

(51) Int. Cl.
*H03D 1/04* (2006.01)
(52) U.S. Cl.
USPC ....................................................... 375/346
(58) Field of Classification Search
USPC ......... 375/316, 324, 340, 341, 342, 295, 299, 375/259, 260, 267, 285; 455/39, 91, 101; 370/203, 208, 210
See application file for complete search history.

(56) References Cited

U.S. PATENT DOCUMENTS

| | | | |
|---|---|---|---|
| 2005/0101259 A1* | 5/2005 | Tong et al. | 455/69 |
| 2005/0129136 A1 | 6/2005 | Fujii et al. | |
| 2005/0249180 A1* | 11/2005 | Murakami et al. | 370/343 |
| 2006/0209813 A1* | 9/2006 | Higuchi et al. | 370/366 |
| 2006/0262869 A1* | 11/2006 | Yoshida | 375/260 |
| 2007/0230639 A1* | 10/2007 | Stirling-Gallacher | 375/347 |
| 2011/0019757 A1 | 1/2011 | Yamada et al. | |

FOREIGN PATENT DOCUMENTS

| | | |
|---|---|---|
| JP | 2004-221702 A | 8/2004 |
| JP | 2005-150839 A | 6/2005 |
| WO | WO 2009/133816 A1 | 11/2009 |

OTHER PUBLICATIONS

Ito et al., "Scattered Pilot OFDM Reception Employing Turbo Interference Cancellation for ICI Caused by Fast Fading Fluctuations", Technical report of the Institute of Electronics, Information and Communication Engineers, NS2003-51, RCS2003-74, Jul. 2003.

(Continued)

*Primary Examiner* — Sam K Ahn
*Assistant Examiner* — Vineeta Panwalkar
(74) *Attorney, Agent, or Firm* — Birch, Stewart, Kolasch & Birch, LLP

(57) ABSTRACT

A propagation channel estimation unit estimates a propagation channel estimated value. A symbol replica generation unit generates a symbol replica which is a modulated symbol from demodulated information. A signal extraction unit extracts each subcarrier component from a received signal from which interference has been removed, based on the propagation channel estimated value and the symbol replica. A demodulation unit demodulates the signals of the subcarrier components extracted by the signal extraction unit.

11 Claims, 13 Drawing Sheets

(56) References Cited

OTHER PUBLICATIONS

Kato et al., "Multipath Division Turbo Equalization with Block Inter-Carrier Interference Cancellation in Cellular System with Amplify-and-Forward Relaying", IEEE 20th International Symposium on Personal, Indoor and Mobile Radio Communications, pp. 2656-2660, Sep. 13, 2009.

Shikida et al., "Performance Evaluation of Iterative Multiuser Detector for MIMO-OFDM IDMA", The Institute of Electronics, Information and Communication Engineers Sogo Taikai Koen Ronbunshu, Mar. 17, 2009, S-74-S-75, BS-3-17.

Shimezawa et al., "A Novel SC/MMSE Turbo Equalization for Multicarrier Systems with Insufficeint Cyclic Prefix", PIMRC 2008, IEEE 19th International Symposium on Personal, Indoor and Mobile Radio Communications, pp. 1-5, Sep. 15, 2008.

International Search Report, dated Jun. 29, 2010, issued in PCT/JP2010/058802.

International Search Report, dated Nov. 16, 2010, issued in PCT/JP2010/063632.

Written Opinion of the International Search Report, dated Nov. 16, 2010, issued in PCT/JP2010/063632.

* cited by examiner

FIG. 6

SIMULATION CONDITIONS

| MODULATION TYPE | 16QAM |
|---|---|
| NUMBER OF FFT POINTS N | 2048 |
| NUMBER OF ACTIVE SUBCARRIERS | 1200 |
| GUARD INTERVAL LENGTH | 144 |
| FRAME LENGTH | 14 OFDM SYMBOLS |
| ERROR CORRECTION CODE | TURBO CODE (CODING RATE 2/3; CONSTRAINT 4) |
| ERROR CORRECTION DECODING | Max-Log-MAP (6 ITERATIONS) |
| NUMBER OF TRANSMITTING ANTENNAS | 1 |
| NUMBER OF RECEIVING ANTENNAS | 1 |
| PROPAGATION CHANNEL MODEL | 12 PATH WITH EXPONENTIAL DECAY MODEL PATH INTERVAL: 12 POWER RATIO BETWEEN PATHS: 1 dB |
| MAXIMUM DOPPLER FREQUENCY | 2000 Hz |
| SUBCARRIER INTERVAL | 15 kHz |
| CENTER FREQUENCY | 2 GHz |
| PROPAGATION CHANNEL ESTIMATION | KNOWN |
| NUMBER OF ITERATIONS IN ITERATIVE PROCESSING | 8 (INCLUDING INITIAL PROCESSING) | ved signal; the reception device including: a propagation
RECEPTION DEVICE, RECEPTION METHOD, AND RECEPTION PROGRAM

TECHNICAL FIELD

The present invention relates to a reception device, a reception method, and a reception program.

The subject application claims priority based on the patent application No. 2009-259931 filed in Japan on Nov. 13, 2009 and incorporates by reference herein the content thereof.

BACKGROUND ART

In wireless communication, and particularly in broadband transmission, in addition to a first reception path, there are paths that arrive with a delay, by reflections from obstacles such as buildings and mountains, thereby resulting in intersymbol interference (ISI). An environment such as this having a plurality of paths of arrival is known as a multipath environment. For example, in multicarrier transmission, such as in OFDM (orthogonal frequency division multiplexing), OFDMA (orthogonal frequency division multiple access), and MC-CDM (multicarrier code division multiplexing), a guard interval (GI) is added to the multicarrier time-domain signal so as to prevent ISI, as long as the delay path is within the GI. Therefore, if the GI length is properly set, it is possible to achieve good transmission quality that is not affected by ISI. However, in the case in which the reception device is moving at a high speed, the propagation channel variation within one OFDM symbol becomes large, resulting in the occurrence of intercarrier interference (ICI). Such an environment is known as high-speed fading. ICI greatly deteriorates the receiving performance.

Non-Patent Reference 1 describes turbo ICI cancellation technology. Specifically, Non-Patent Reference 1 describes the generation of an ICI replica from the bit-log likelihood ratio (LLR) of the results of error correction decoding and the removal of the generated replica from the received signal, so as to suppress the ICI and perform suppression of the ICI removal residue and optimum detection with respect to the signal remaining after the removal.

PRIOR ART DOCUMENT

Non-Patent Document

Non-Patent Reference 1: Masafumi Ito, Satoshi Suyama, Kazuhiko Fukawa, Hiroshi Suzuki, "Scattered Pilot OFDM Reception Employing Turbo Interference Cancellation for ICI Caused by Fast Fading Fluctuations", Technical report of The Institute of Electronics, Information and Communication Engineers, RCS2003-74; July 2003.

DISCLOSURE OF INVENTION

Problem to be Solved by the Invention

With the technology of Non-Patent Reference 1, however, because optimum detection is performed for each carrier, the amount of calculation increases. Specifically, with the technology of Non-Patent Reference 1, because order of the number of multiplications in detection processing for each carrier is O(N) (where N is the number of FFT points, that is, the order of the number of FFT points), there is a problem that total is an order of $O(N^2)$. Also, with the technology of Non-Patent Reference 1, $O(N^2 \log_2 N)$ multiplications are required to generate an optimum detection filter, there being the problem of a large-capacity memory being required to store these.

Thus, with conventional technology, there was a drawback that the amount of calculation when detecting information from a signal received in a fast fading environment in which a delay path exists becomes large.

The present invention was made in consideration of the above-noted points, and provides a reception device, a reception method, and a reception program that enable the prevention of an increase in the amount of calculation when detecting information from a received signal in a fast fading environment in which a delay path exists.

Means to Solve the Problem (1) The present invention was made to solve the above-described problem, a first aspect of the present invention is a reception device which demodulates information from a received signal; the reception device including: a propagation channel estimation unit which estimates a propagation channel estimated value; a symbol replica generation unit which generates a symbol replica which is a modulated symbol from demodulated information; a signal extraction unit which extracts each subcarrier component from a received signal from which interference has been removed, based on the propagation channel estimated value and the symbol replica; and a demodulation unit which demodulates the signals of the subcarrier components extracted by the signal extraction unit.

According to the above-noted constitution, the reception device extracts each subcarrier component of the received signal from which the delayed signals have been removed, and demodulates the signals of each extracted subcarrier component, thereby enabling prevention of an increase in the amount of calculation.

(2) In the first aspect of the present invention, the signal extraction unit may include: a filter unit which generates received signal replicas which are replicas of the received signals in the time domain, based on the propagation channel estimated value and the symbol replicas; a subtraction unit which subtracts the received signal replicas from the received signals; a time-to-frequency transformation unit which converts a signal subtracted by the subtraction unit into a frequency-domain signal; and a reconstruction unit which generates replica signals of desired signals, based on the propagation channel estimated value and the symbol replicas, which adds the replica signals of the desired signals with respect to the frequency-domain signals converted by the time frequency converter, and which extracts each of the subcarrier components from a received signal.

(3) In the first aspect of the present invention, the reconstruction unit may extract the subcarrier components from the frequency-domain signals converted by the time-to-frequency transformation unit, and add the subcarrier components of the replica signals of the desired signals with respect to the extracted signals from the subcarrier component.

(4) In the first aspect of the present invention, the reconstruction unit may extract the subcarrier components from the frequency-domain signal converted by the time-to-frequency transformation unit, and add to the extracted subcarrier component signal the subcarrier components which are subcarrier components of the replica signals of the desired signals and which exist in proximity to the subcarrier.

(5) In the first aspect of the present invention, the reception device may include a plurality of antennas and performs communication with a transmission device by MIMO transmission.

(6) In the first aspect of the present invention, the demodulation unit may perform MIMO separation based on the propagation channel estimated value.

(7) In the first aspect of the present invention, the reception device may receive signal streams as the received signals transmitted from each of a plurality of antennas of the transmission device wherein the signal extraction unit may include: a filter unit which generates received signal replicas which are replicas of the received signals in the time domain, based on the propagation channel estimated value and the symbol replicas; a subtraction unit which subtracts the received signal replicas from the received signals; a time-to-frequency transformation unit which transforms a signal subtracted by the subtraction unit into a frequency-domain signal; and a reconstruction unit which generates replica signals of desired signals, based on the propagation channel estimated value and the symbol replicas, which adds the replica signals of the desired signals with respect to the frequency-domain signal transformed by the time frequency converter, and which extracts each of the subcarrier components from a received signal, wherein the reconstruction unit may extract the subcarrier components from the frequency-domain signal converted by the time frequency converter, and add to the extracted subcarrier component signal the desired stream components of the subcarrier components of the replica signals of the desired signals.

(8) In the first aspect of the present invention, the reception device may receive signal streams as the received signal transmitted from each of a plurality of antennas provided of the transmission device, wherein the signal extraction unit may include: a filter unit which generates received signal replicas which are replicas of the received signals in the time domain, based on the propagation channel estimated value and the symbol replicas; a subtraction unit which subtracts the received signal replicas from the received signals; a time-to-frequency transformation unit which transforms a signal subtracted by the subtraction unit into a frequency-domain signal; and a reconstruction unit which generates replica signals of desired signals, based on the propagation channel estimated value and the symbol replicas, which adds the replica signals of the desired signals with respect to the frequency-domain signal transformed by the time frequency converter, and which extracts each of the subcarrier components from a received signal, wherein the reconstruction unit may extract the subcarrier components from the frequency-domain signal converted by the time frequency converter, and add to the extracted subcarrier component signal all stream components of the subcarrier components of the replica signals of the desired signals.

(9) In the first aspect of the present invention, the demodulation unit may demodulate a signal using the least mean square error criteria.

(10) A second aspect of the present invention is a method for receiving in a reception device which demodulates information from a received signal, the method including: estimating, by a propagation channel estimation unit, a propagation channel estimated value; generating, by a symbol replica generation unit, symbol replicas which are modulated symbols from demodulated information; extracting, by a signal extraction unit, each subcarrier component from a received signal from which interference has been removed, based on the propagation channel estimated value and the symbol replicas; and demodulating, by a demodulation unit, the signal of the extracted subcarrier components.

(11) A third aspect of the present invention is a reception program causing a computer of a reception device which demodulates information from a received to function as: a propagation channel estimation unit which estimates a propagation channel estimated value; a symbol replica generation unit which generates symbol replicas which are modulated symbols from demodulated information; a signal extraction unit which extracts each subcarrier component from a received signal from which interference has been removed, based on the propagation channel estimated value and the symbol replicas; and a demodulation unit which demodulates the signals of the subcarrier components extracted by the signal extraction unit.

Effect of the Invention

According to the present invention, in a reception device for wireless communication, it is possible to prevent an increase in the amount of calculation when detecting information from a signal received in a fast fading environment in which a delay path exists.

BRIEF DESCRIPTION OF THE DRAWINGS

FIG. 6 is a simplified drawing showing an example of simulation conditions in a communication system according to this embodiment.

BEST MODE FOR CARRYING OUT THE INVENTION

First Embodiment

Figure 1:
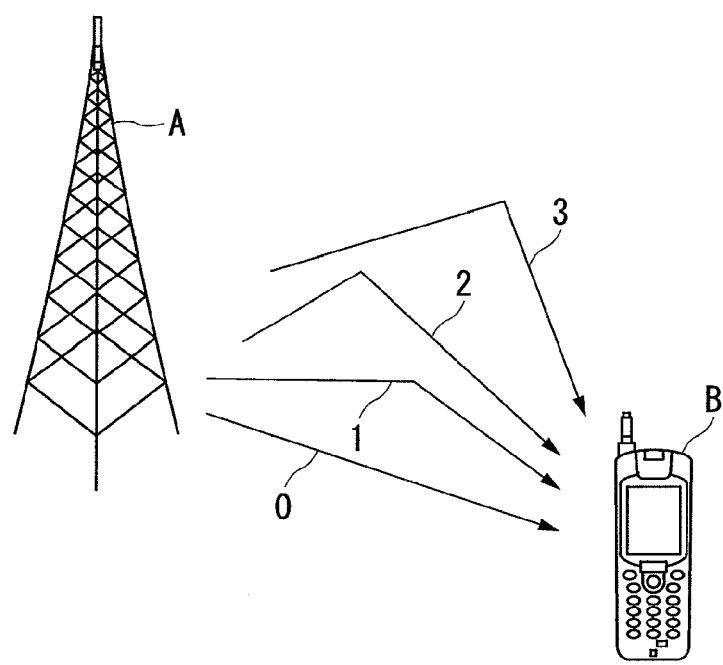
FIG. 1 is a conceptual drawing of a communication system according to a first embodiment of the present invention.

The first embodiment of the present invention will be described below, with references made to the drawings.
FIG. 1 is a conceptual drawing of a communication system according to the first embodiment of the present invention.
In this drawing, the communication system has a transmission device A and a reception device B. This drawing shows a transmitted signal transmitted from the transmission device A being received by the reception device B via D+1 propagation channels (also called paths) (D=3 in FIG. 1) d (d=0, 1, 2, ... D) because of reflections from buildings or the like. In this case, d are numbers that are assigned in the ranking sequence of shortness of the propagation channel (in the ranking sequence of the shortness of the arrival time of the signal via the propagation channels), numbers being assigned from the higher number (d being called the propagation channel number). The symbol D indicates the largest propagation channel number and, for example, the case of D=3 indicates that there are four propagation channels.

In the present embodiment described below, the transmission device A is the transmission device a1, and the reception device B is the reception device b1.

<Constitution of the Transmission Device a1>

Figure 2:
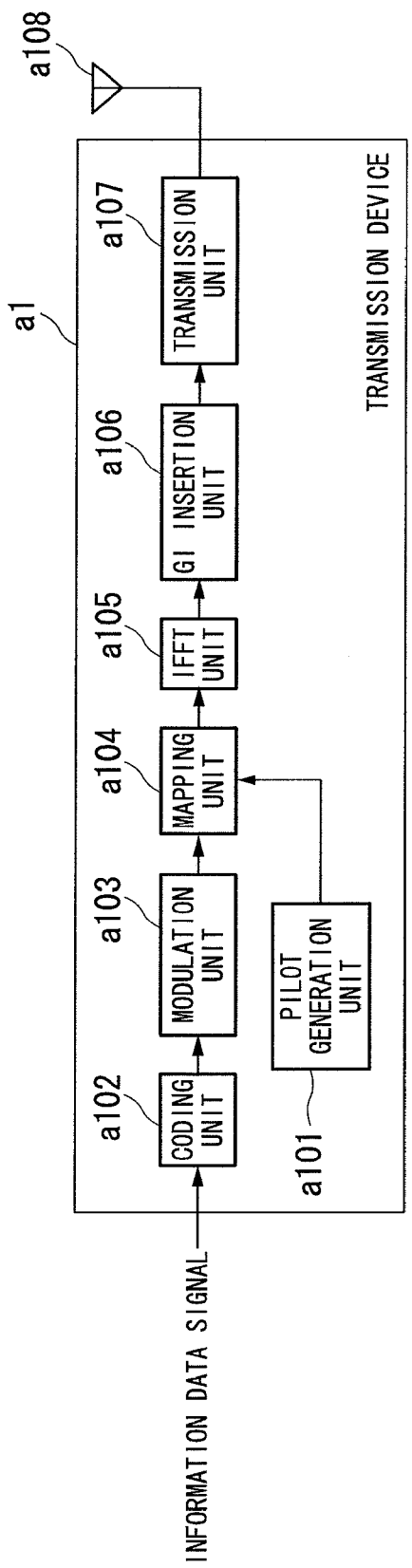
FIG. 2 is a simplified block diagram showing the constitution of a transmission device according to this embodiment.

FIG. 2 is a simplified block diagram showing the constitution of the transmission device a1 in the present embodiment. In this drawing, the transmission device a1 is constituted to include a pilot generation unit a101, a coding unit a102, a modulation unit a103, a mapping unit a104, an IFFT unit a105, a GI insertion unit a106, a transmission unit a107, and a transmitting antenna a108.

The pilot generation unit a101 generates a pilot signal, the amplitude value of the waveform (or signal stream) of which is stored by the reception device b1 beforehand, and outputs it to the mapping unit a104.

The coding unit a102 codes the information bits to be transmitted to the reception device b1, using a error correction code such as convolution code, a turbo code, or an LDPC (low-density parity check) code, and generates coded bits. The coding unit a102 outputs the generated coded bits to the modulation unit a103.

The modulation unit a103 modulates the coded bits input from the coding unit a102, using a modulation mode such as PSK (phase shift keying) or QAM (quadrature amplitude modulation), and generates modulation symbols. The modulation unit a103 outputs the generated modulation symbols to the mapping unit a104.

The mapping unit a104 maps the pilot signal input from the pilot generation unit a101 and the modulation symbols input from the modulation unit a103, based on pre-established mapping information onto resources (time-frequency band) and generates a frequency-domain signal and outputs the generated frequency-domain signal to the IFFT unit a105. Resources are units of placement of modulation symbols, constituted by one subcarrier and one FFT duration, to be described later, in a frame transmitted by the transmission device a1. The mapping information is decided by the transmission device a1, and notified beforehand by the transmission device a1 to the reception device b1.

The IFFT unit a105 performs a frequency-to-time transformation of the frequency-domain signal input from the mapping unit a104 to generate a time-domain signal. Herein, the time duration unit in which the IFFT is performed is called the FFT duration. The IFFT unit a105 outputs the generated time-domain signal to the GI insertion unit a106.

The GI insertion unit a106 adds a guard interval to the time-domain signal input from the IFFT unit a105, for each signal of an FFT duration. In this case, the guard interval is a copy of a part of the end of the signal of an FFT duration, and the GI insertion unit a106 adds this copied signal to the front of the signal of the FFT duration.

The FFT duration and the time duration (GI duration) of the guard interval added to the signal of the time domain by the GI insertion unit a106 are collectively referred to as the OFDM symbol duration. The signal of the OFDM symbol duration is called the OFDM symbol. The GI insertion unit a106 outputs the signal to which the guard interval has been added to the transmission unit a107.

The transmission unit a107 performs digital-to-analog conversion of the signal input from the GI insertion unit a106 and wave-shapes the converted analog signal. The transmission unit a107 up-converts the wave-shaped signal from the baseband to the wireless frequency band, and transmits it to the reception device b1 from the transmitting antenna a108.

<Constitution of the Reception Device b1>

Figure 3:
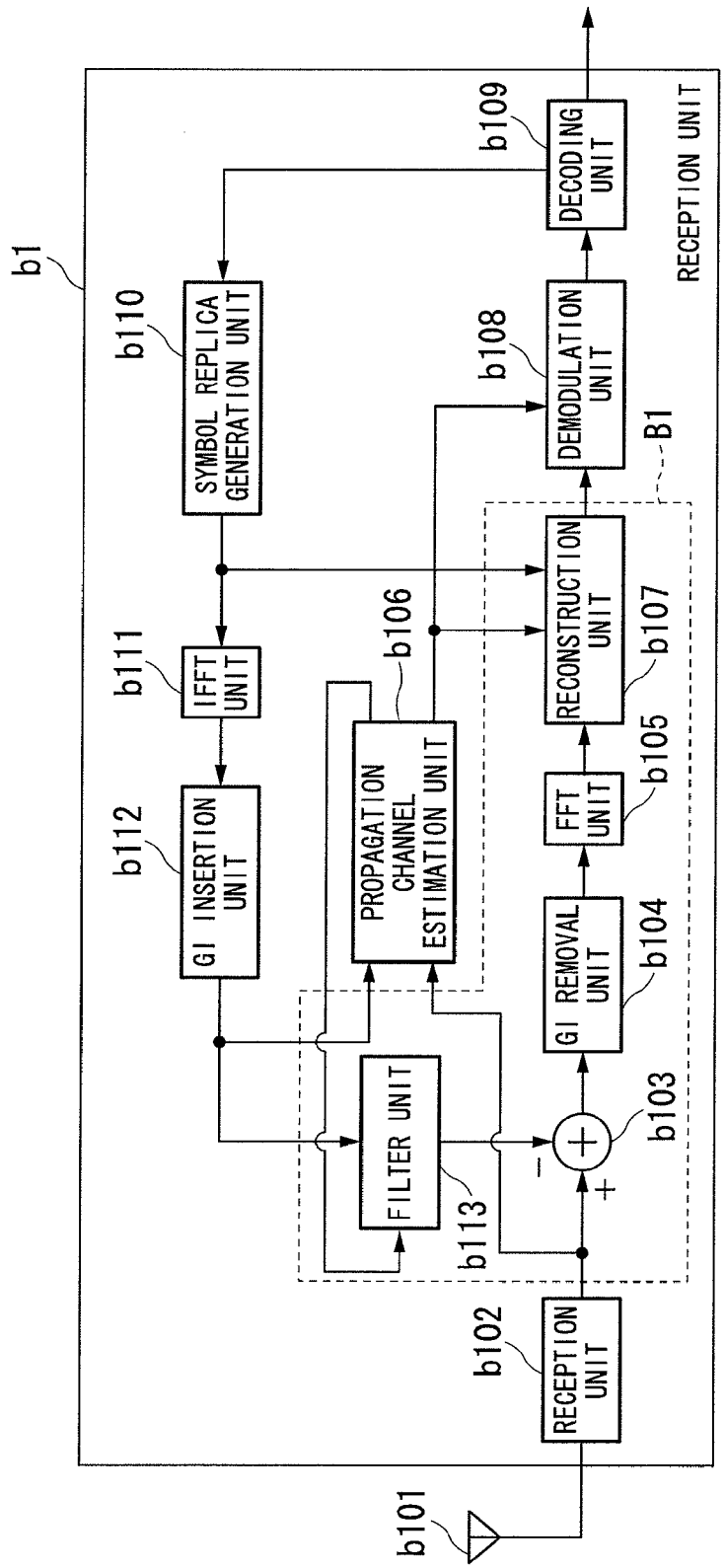
FIG. 3 is a simplified block diagram showing the constitution of a reception device according to this embodiment.

FIG. 3 is a simplified block diagram showing the constitution of the reception device b1 in the present embodiment. In this drawing, the reception device b1 is constituted to include a receiving antenna b101, a reception unit b102, a subtraction unit b103, a GI removal unit b104, an FFT unit b105, a propagation channel estimation unit b106, a reconstruction unit b107, a demodulation unit b108, a decoding unit b109, a symbol replica generation unit b110, an IFFT unit b111, a GI insertion unit b112, and a filter unit b113. In this case, the subtraction unit b103, the GI removal unit b104, the FFT unit b105, the reconstruction unit b107, and the filter unit a113 are called the signal extraction unit B1.

The reception unit b102 receives the transmitted signal transmitted by the transmission device a1, via the receiving antenna b101. The reception unit b102 performs frequency conversion and analog-to-digital conversion of the received signal and stores the converted received signal. The reception unit b102 outputs the stored received signal to the subtraction unit b103 and the propagation channel estimation unit b106, at the timing of the initial processing and input of the received signal replica to the subtraction unit b103 by the filter unit b113, to be described later.

The subtraction unit b103 subtracts from the received signal input from the reception unit b102 the received signal replica input from the filter unit b113, which is described later. The subtraction unit b103 outputs to the GI removal unit b104 the signal from which the received signal replica has been subtracted.

In the case of the initial processing, there is no (that is, zero) input from the filter unit b113 to the subtraction unit b103, and the subtraction unit b103 outputs the received signal input from the reception unit b102 as is to the GI removal unit b104.

The GI removal unit b104 removes the GI from the signal input from the subtraction unit b103, and outputs the signal from which the GI has been removed to the FFT unit b105.

The FFT unit b 105 performs time-to-frequency transformation of the time-domain signal input from the GI removal unit b104, and outputs the transformed frequency-domain signal to the reconstruction unit b107.

The propagation channel estimation unit b106, based on the received signal input from the reception unit b102 and the transmitted signal replica signal input from the GI insertion unit b112, to be described later, estimates the channel impulse response in the OFDM symbol duration. In this case, the RLS (recursive least square) algorithm may be used for the estimation of the channel impulse response, and another algorithm, for example, the LMS (least mean square) algorithm may also be used. In the case of initial processing, there is no (that is, zero) input from the GI insertion unit b112 to the propagation channel estimation unit b106, and the propagation channel estimation unit b106 estimates the channel impulse response that varies with time in the OFDM symbol duration, based on the previously stored pilot signal, and the received signal input from the reception unit b102.

The propagation channel estimation unit b106 outputs the estimated channel impulse response to the filter unit b113. The propagation channel estimation unit b106 also performs time-to-frequency transformation of the estimated channel impulse response and outputs the frequency response, which is the transformed frequency-domain signal, to the reconstruction unit b107 and the demodulation unit b108.

The propagation channel estimation unit b106 also generates a replica of the pilot signal from estimated frequency response and the previously stored pilot signal. The propagation channel estimation unit b106 calculates the noise power, based on the pilot signal of the received signal and on the generated pilot signal replica. The propagation channel estimation unit b106 also calculates the ICI power, based on the estimated frequency response and the pilot signal. The details of the initial processing performed by the propagation channel estimation unit b106 to calculate the noise power and the ICI power will be described later, together with the operating principle. The propagation channel estimation unit b106 outputs the calculated noise power and ICI power to the demodulation unit b108.

For each subcarrier, the reconstruction unit b107 multiplies the frequency response input from the propagation channel estimation unit b106 by the symbol replica input from the symbol replica generation unit b110 to be described later, and generates a replica signal of the desired signal that is influenced by the propagation channel. The reconstruction unit b107, for each subcarrier, adds the generated replica signal to the signal input from the FFT unit b105. That is, the reconstruction unit b107, based on the propagation channel estimated value and the symbol replica, generates a replica signal of the desired signal, adds the replica signal of the desired signal to the frequency-domain signal transformed by the FFT unit b105, and extracts each subcarrier component of the received signal.

The reconstruction unit b107 outputs the signal to which the replica signal has been added to the demodulation unit b108.

In the case of initial processing, there is no (that is, zero) input to the reconstruction unit b107 from the symbol replica generation unit b110, and the reconstruction unit b107 outputs the signal input from the FFT unit b105 as is to the demodulation unit b108.

In the above-described manner, the signal extraction unit B1, removes the received signal replica from the received signal, based on the propagation channel estimated value and the symbol replica and, by reconstructing the desired signal, extracts each subcarrier component of the received signal, with the ICI (interference) removed.

The demodulation unit b108 calculates filter coefficients, based on the ZF (zero forcing) criteria and the MMSE (minimum mean square error) criteria or the like, using the frequency response, the noise power, and the ICI power, which have been input from the propagation channel estimation unit b106. The demodulation unit b108, using the calculated filter coefficients, performs compensation (called propagation channel compensation) of the variation of the amplitude and phase of the signal. The demodulation unit b108 de-maps the signal that has been propagation channel compensated, based on mapping information that is previously notified from the transmission device a1, and performs demodulation processing of the de-mapped signal. The demodulation unit b108 outputs the bit-log likelihood ratio (LLR) of the result of the demodulation to the decoding unit b109.

The decoding unit b109 performs decoding processing of the demodulated symbols input from the demodulation unit b108 using, for example, maximum likelihood decoding (MLD), maximum a posteriori probability (MAP), log-MAP, Max-log-MAP, or SOVA (soft output Viterbi algorithm).

As the result of the decoding processing, if the determination is made that an error is not detected, or that processing has been performed a prescribed number of times, the decoding unit b109 outputs the bit-log likelihood ratio of the result of decoding, as information data bit. However, if the determination is made that an error is detected and also that the processing has not been performed the prescribed number of times, the decoding unit b109 outputs the bit-log likelihood ratio of the result of decoding to the symbol replica generation unit b110.

The symbol replica generation unit b110 calculates the expected value of the bit-log likelihood ratio input from the decoding unit b109, decodes and modulates the calculated expected value and generates a modulation symbol (called the symbol replica). The symbol replica generation unit b110 maps the generated symbol replica based on the mapping information that was notified from the transmission device a1 beforehand. The symbol replica generation unit b110 outputs the mapped symbol replica to the reconstruction unit b107 and the IFFT unit b111.

The IFFT unit bill performs frequency-to-time transformation of the symbol replica input from the symbol replica generation unit b110, and outputs the transformed time-domain replica signal to the GI insertion unit b112.

The GI insertion unit b112, for each signal in the FFT duration, adds a guard interval to the replica signal input from the IFFT unit bill, and generates the transmitted signal replica. The GI insertion unit b112 outputs the generated transmitted signal replica to the propagation channel estimation unit b106 and the filter unit b113.

The filter unit b113 generates the received signal replica, based on the channel impulse response input from the propagation channel estimation unit b106 and the transmitted signal replica input from the GI insertion unit b112. The filter unit b113 outputs the generated received signal replica to the subtraction unit b103.

With respect to the same signal, the reception device b1 repeats the processing (iterative processing) from the above-noted subtraction unit b103 to the filter unit b113, until the decoding unit b109 detects no error or until a prescribed number of times.

Figure 4:
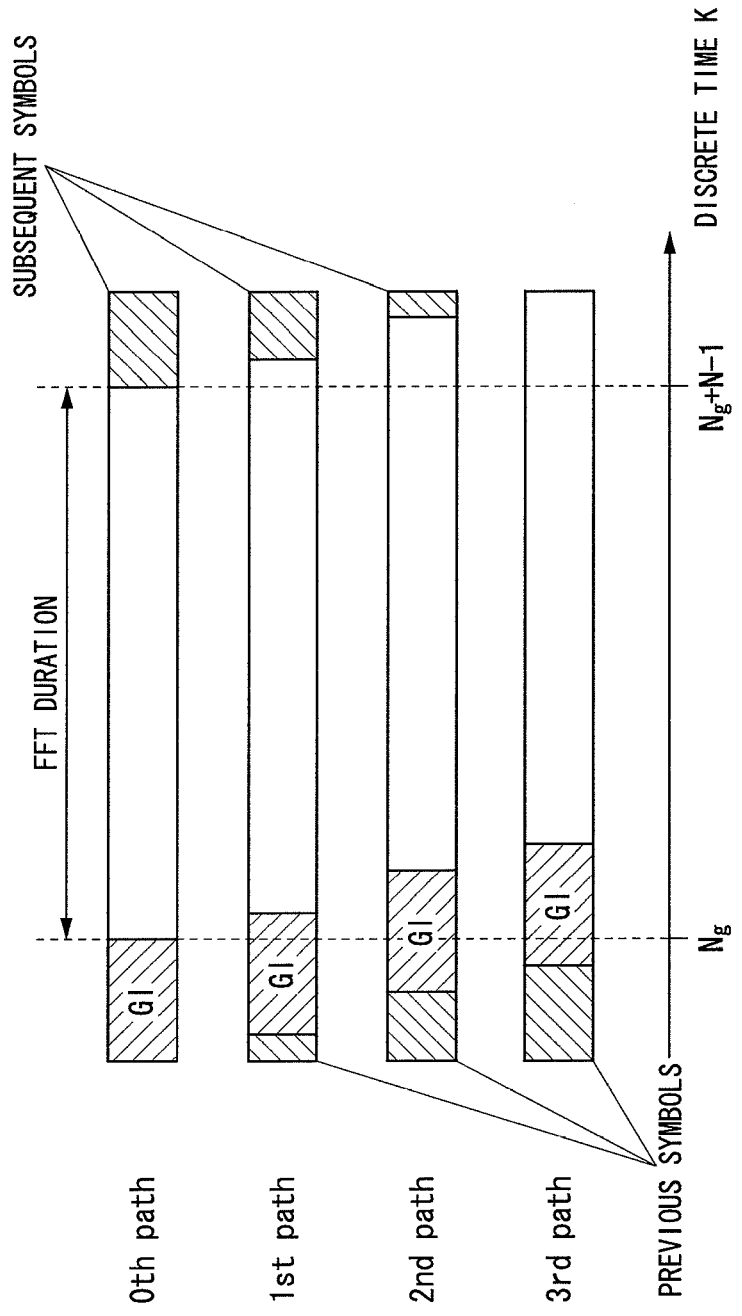
FIG. 4 is a simplified drawing showing an example of a received signal according to this embodiment.

FIG. 4 is a simplified drawing of an example of a received signal in the present embodiment. This drawing shows the case in which the maximum delay does not exceed the GI length, and there is no interference from the previous OFDM symbol.

In this drawing, the received signals received via the propagation channels with the propagation channel numbers 1, 2, 3, and 4 of FIG. 1 are shown in the sequence from the top of $0^{th}$ path, $1^{st}$ path, $2^{nd}$ path, and $3^{rd}$ path.

In FIG. 4, the horizontal axis is the time axis, has discrete times partitioned with a pre-established time width. In this drawing, the regions hatched with inclined lines rising to left indicate the GIs (guard intervals), and the regions hatched with inclined lines rising to the right indicate the received signal of the OFDM signal before and after.

The symbol N indicates the number of FFT (fast Fourier transform) duration points (which is also the number if IFFT (inverse fast Fourier transform) duration points), $N_g$ being the number of GI points. In this case, the number of points is the number of discrete times.

<Operating Principle>

The operating principle of the reception device b1 will be described below, with references made to FIG. 3.

The operating principle at the initial processing will first be described. The k-th discrete time received signal $r_k$ received by the reception device b102 is expressed by the following Equations (1) and (2).

$$r_k = \sum_{d=0}^{D} h_{d,k} s_{k-d} + z_k \tag{1}$$

$$s_k = \frac{1}{\sqrt{N}} \sum_{n=0}^{N-1} S_n \exp\left[j\frac{2\pi n}{N}(k - N_g)\right] \tag{2}$$

In the above, D is the maximum propagation channel number, $h_{d,k}$ is the complex amplitude at the k-th discrete time on the propagation channel number d path (called the d-th path), $s_k$ is the time-domain transmitted signal, and $z_k$ is the time-domain noise. Additionally, N is the number of points in an FFT duration, $S_n$ is the n-th subcarrier modulation signal, $N_g$ is the number of points in the GI duration (refer to FIG. 4), and j is the unit of an imaginary number.

With respect to the received signal $r_k$ of the FFT duration (from $k=N_g$ to $k=N_g+N-1$ in FIG. 4), the signal $R_n$ after time-to-frequency transformation in the FFT unit b105 is expressed by the following Equations (3) and (4).

$$R_n = \frac{1}{\sqrt{N}} \sum_{n=N_g}^{N_g+N-1} r_k \exp\left[-j\frac{2\pi n}{N}(k - N_g)\right] \tag{3}$$

$$= W_{n,n} S_n + \sum_{m=0, m\neq n}^{N-1} W_{n,m} S_m + Z_n$$

$$W_{n,m} = \frac{1}{N} \sum_{d=0}^{D} \sum_{k=N_g}^{N_g+N-1} h_{d,k} \exp\left[-j\frac{2\pi(n-m)}{N}(k - N_g)\right] \exp\left(-j\frac{2\pi n}{N} d\right) \tag{4}$$

In the above, $W_{n,m}$ is the coefficient of leakage of the signal from the m-th subcarrier into the n-th subcarrier, and $Z_n$ is the noise on the n-th subcarrier. In the case in which m=n in Equation (4), $W_{n,n}$ is the frequency response of the n-th subcarrier, expressed by the following Equation (5).

$$W_{n,n} = \sum_{d=0}^{D} \left(\frac{1}{N} \sum_{k=N_g}^{N_g+N-1} h_{d,k}\right) \exp\left(-j\frac{2\pi n}{N} d\right) \tag{5}$$

The Equation (5) coincides with the result of the discrete Fourier transform of the time average of the channel impulse response that varies with time within an OFDM symbol. At the initial processing, the propagation channel estimation unit b106 estimates $W_{n,n}$ directly, using the pilot signal. At the initial processing, the signal indicated by Equation (3) is output from the FFT unit b105 as is to the demodulation unit b108, via the reconstruction unit b107. In the case, for example, of using a filtering of the MMSE criteria, the demodulation unit b108 calculates the demodulation symbol $S'_n$ using the following Equation (6).

$$S'_n = \frac{W^*_{n,n}}{W^*_{n,n} W_{n,n} + \sigma_Z^2 + \sigma_I^2} R_n \tag{6}$$

In the above, Y* indicates the complex conjugate of Y. At the initial processing, because receiving processing is performed without removing the ICI, the influence thereof causes deterioration of the transmission performance. Additionally, in Equation (6) $\sigma_Z^2$ is the noise power, and $\sigma_I^2$ is the ICI power, which are calculated in the propagation channel estimation unit b106, using the following Equations (7) and (8).

$$\sigma_Z^2 = E[|Z_n|^2] \tag{7}$$

$$\sigma_I^2 = E\left[\left|\sum_{m=0,m\neq n}^{N-1} W_{n,m} S_m\right|^2\right] \tag{8}$$

In the above, E[X] is the ensemble average of X. In the present embodiment, the propagation channel estimation unit b106 calculates the $\sigma_Z^2$ noise power and the $\sigma_I^2$ ICI power using the pilot signal, the results being used in Equation (6) to calculate the demodulation symbol $S'_n$.

The demodulation unit b108 calculates the bit-log likelihood ratio from the demodulation symbol $S'_n$, using Equation (6). The equivalent amplitude gain is used in this calculation processing. Specifically, in the case of QPSK, with respect to the equivalent amplitude gain $\mu_n$ for the n-th subcarrier, expressed by the following Equation (9), the bit-log likelihood ratio λ is expressed by the following Equations (10) and (11). In this case, Equations (10) and (11) are the bit-log likelihood ratios $\lambda(b_{n,0})$ and $\lambda(b_{n,1})$ for the first bit $b_{n,0}$ and the second bit $b_{n,1}$ respectively.

$$\mu_n = \frac{W^*_{n,n} W_{n,n}}{W^*_{n,n} W_{n,n} + \sigma_Z^2 + \sigma_I^2} \tag{9}$$

$$\lambda(b_{n,0}) = \frac{4\text{Re}[S'_n]}{\sqrt{2}(1 - \mu_n)} \tag{10}$$

$$\lambda(b_{n,1}) = \frac{4\text{Im}[S'_n]}{\sqrt{2}(1 - \mu_n)} \tag{11}$$

Next, the operating principle of iterative processing will be described. The symbol replica generation unit b110 calculates the expected value of the bit-log likelihood ratio decoded by the decoding unit b109 and decodes and modulates the calculated expected value to generate the symbol replica $S''_n$. The symbol replica $S''_n$ is frequency-to-time transformed by the IFFT unit b111, a GI being inserted at the GI insertion unit b112. The transmitted signal replica $s''_k$ output by the GI insertion unit b112 is expressed by the following Equation (12).

$$s''_k = \frac{1}{\sqrt{N}} \sum_{n=0}^{N-1} S''_n \exp\left[j\frac{2\pi n}{N}(k - N_g)\right] \tag{12}$$

In this case, in order to generate the transmitted signal replica $s''_k$ of Equation (12), the IFFT unit b111 performs an inverse fast Fourier transform, and the order of the number of multiplications in that transformation is $O(N \log_2 N)$.

The propagation channel estimation unit b106, based on the transmitted signal replica expressed by Equation (12) and the received signal input from the reception unit b102, estimates the channel impulse response $h_{d,k}$. The propagation channel estimation unit b106 also takes the time average of the channel impulse response $h_{d,k}$ and performs a time-to-frequency transformation, calculating the frequency response $W_{n,n}$.

The filter unit b113, based on the channel impulse response $h_{d,k}$ and the transmitted signal replica $s''_k$ expressed by Equation (12), generates the received signal replica $r''_k$ expressed the following Equation (13).

$$r''_k = \sum_{d=0}^{D} h_{d,k} s''_{k-d} \qquad (13)$$

In order to generate the received signal replica of Equation (13), the order of the number of multiplications in the processing performed by the filter unit b113 is O(DN). In this case, because generally D<<N, this can be thought of as O(N).

The subtraction unit b103 subtracts the received signal replica $r''_k$ expressed by Equation (13) from the received signal $r_k$ expressed by Equation (1), and outputs the signal $r'_k$ expressed by the following Equation (14).

$$r'_k = r_k - r''_k \qquad (14)$$
$$= \sum_{d=0}^{D} h_{d,k}(s_{k-d} - s''_{k-d}) + z_k$$

The GI removal unit b104 removes the GI from the FFT duration signal $r'_k$, and the FFT unit b105 performs a time-to-frequency transformation of the signal from which the GI is removed. The signal $R'_n$ output by the FFT unit b105 is expressed by the following Equation (15).

$$R'_n = \frac{1}{\sqrt{N}} \sum_{n=N_g}^{N_g+N-1} r'_k \exp\left[-j\frac{2\pi n}{N}(k-N_g)\right] \qquad (15)$$
$$= W_{n,n}(S_n - S''_n) + \sum_{m=0, m \neq n}^{N-1} W_{n,m}(S_m - S''_m) + Z_n$$

In this case, in order to generate the signal $R'_n$ of Equation (15), the FFT unit b105 performs a fast Fourier transform, the order of the number of multiplications in this transformation being O(N log$_2$ N).

The reconstruction unit b107 multiplies the symbol replica $S''_n$ by the frequency response $W_{n,n}$, and generates the replica signal $W_{n,n}S''_n$ of the desired signal that has been influenced by the propagation channel. The reconstruction unit b107 adds the generated replica signal $W_{n,n}S''_n$ to the signal $R'_n$ expressed by Equation (15). The signal $Y_n$ after this addition is expressed by the following Equation (16).

$$Y_n = R'_n + W_{n,n}S''_n \qquad (16)$$
$$= W_{n,n}S_n + \sum_{m=0, m \neq n}^{N-1} W_{n,m}(S_m - S''_m) + Z_n$$

This Equation (16) means the signal in which the desired signal of the n-th subcarrier remains and from which the ICI is removed. By the removal of the ICI, it is possible to improve the signal-to-interference-plus-noise ratio (SINR), and to improve the transmission performance.

Because the reconstruction unit b107 performs processing for generation of the signal $Y_n$ of Equation (16) for each subcarrier, the order of the number of multiplications in this processing is O(N). In the case, for example, in which a filtering of the MMSE criteria is used, the demodulation unit b108 performs demodulation by calculating the demodulation symbol $S'_n$ of the n-th subcarrier expressed by the following Equation (17) from the signal $Y_n$ expressed by Equation (16).

$$S'_n = \frac{E[|S_n|^2]W^*_{n,n}}{W[|S_n|^2]W^*_{n,n}W_{n,n} + \sum_{m=0, m \neq n}^{N-1}(E[|S_m|^2] - |S''_m|^2)W^*_{n,m}W_{n,m} + \sigma_z^2} Y_n \qquad (17)$$

In the present embodiment, the reconstruction unit b107 calculates the demodulation symbol $S'_n$ using the approximation equation (19) to be described later.

The decoding unit b109 performs decoding processing with respect to the bit-log likelihood ratio $\lambda(b_{n,0})$ and $\lambda(b_{n,1})$ of the demodulation symbol $S'_n$ expressed by Equation (17). After that, iterative processing is repeated. By repeating the iterative processing described above, it is possible to greatly improve the transmission performance.

In the frequency response $W_{n,n}$ expressed by Equation (5), the center value of the symbol in the varying channel impulse response may be used in place of the channel impulse response in Equation (5). In this case, the frequency response $W_{n,n}$ used in place of Equation (5) is expressed by the following Equation (18).

$$W_{n,n} = \sum_{d=0}^{D} h_{d,N_g+N/2}\exp\left(-j\frac{2\pi n}{N}d\right) \qquad (18)$$

By doing this, it is possible to reduce the calculation processing for the frequency response $W_{n,n}$.

Equation (17) is an equation for the case of precisely considering the removal residue by the received signal replica, acquiring information beforehand by decoding processing and further not being able to normalize the power of the modulation symbols in each subcarrier to 1. With respect to this, the removal residue may be noise approximated and the power of the demodulation symbol may be normalized to 1. In this case, the demodulation unit b108 calculates the demodulation symbol $S'_n$ using the following Equation (19).

$$S'_n = \frac{W^*_{n,n}}{W^*_{n,n}W_{n,n} + \sigma_z^2 + \sigma_{I'}^2} Y_n \qquad (19)$$

In the above, $\sigma_I^2$ is the power of the ICI removal residue (the ensemble average with regard to the subcarrier of the signal $R'_n$). The performance does not deteriorate even if this is done. In Equation (17), a number of multiplications having an order of O(N$^2$) is required for calculation of the ICI removal residue of the second term in the denominator. However, by using Equation (19), processing is possible with an order of the number of multiplications being O(N), and it is possible to greatly reduce the number of multiplications. Thus, the order of the maximum number of multiplications in each part of the iterative processing is O(N log$_2$ N), and the reception device b1 can perform iterative processing by processing having a number of multiplications with an order of $O(N \log_2 N)$.

<Operation of the Reception Device b1>

Figure 5:
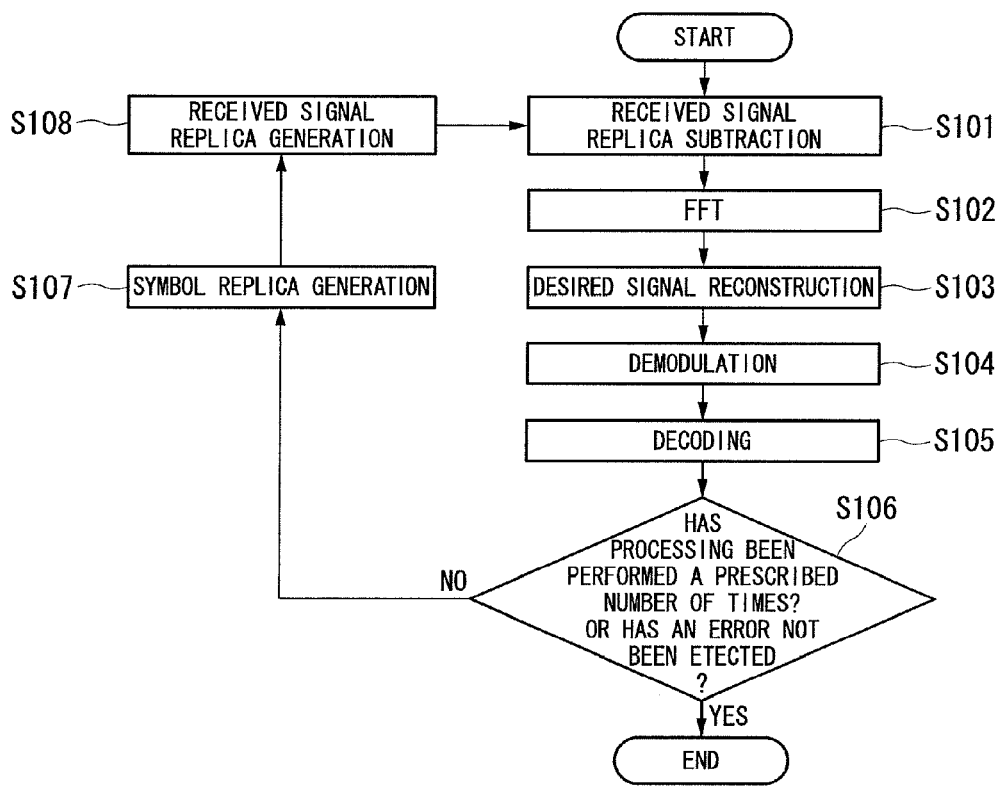
FIG. 5 is a flowchart showing the operation of the reception device according to this embodiment.

FIG. 5 is a flowchart showing the operation of the reception device b1 according to the present embodiment. The operation shown in this drawing is the processing after the reception unit b102 outputs the initially received signal to the subtraction unit b103.

(Step S101) The subtraction unit b103 subtracts the received signal replica generated at step S108, which is described later, from the received signal. After that, processing proceeds to step S102.

(Step S102) The FFT unit b105 performs a time-to-frequency transformation with respect to the signal resulting from the subtraction at step S101. After that, processing proceeds to step S103.

(Step S103) The reconstruction unit b107, for each subcarrier, adds to the signal resulting from the transformation at step S102 a symbol replica signal that is the symbol replica generated at step S107, which is described below, multiplied by the frequency response. After that, processing proceeds to step S104.

(Step S104) The demodulation unit b108 compensates the propagation channel and calculates the bit-log likelihood ratio with respect to the signal resulting from the addition at step S103. After that, processing proceeds to step S105.

(Step S105) The decoding unit b109 performs decoding processing, such as error correction, with respect to the bit-log likelihood ratio resulting from the calculation at step S104. After that, processing proceeds to step S106.

(Step S106) The decoding unit b109 determines whether an error is not detected in the decoding results from step S105 or whether processing has been performed a prescribed number of times. In either case (Yes), the reception device b1 stops operation. However, if neither of these conditions has occurred (No), processing proceeds to step S107. The determination of whether an error has occurred in the decoding results may be performed, for example, at the MAC (media access control) layer.

(Step S107) The symbol replica generation unit b110 generates a symbol replica from the bit-log likelihood ratio of the decoding results at step S105. After that, processing proceeds to step S108.

(Step S108) The IFFT unit b111, the GI insertion unit b112, and the filter unit b113 generate a received signal replica, based on the symbol replica generated at step S107. After that, processing proceeds to step S101.

In this manner, according to the present embodiment, the reception device b1 extracts each subcarrier component of the received signal from which the ICI has been removed, and demodulates the signals of each extracted subcarrier component. By doing this, the reception device b1 can prevent an increase in the amount of calculation.

Experimental Results

The results of a computer simulation performed to indicate the effective of a communication system according to the present embodiment will be described below.

FIG. 6 is a simplified drawing showing an example of simulation conditions in a communication system according to this embodiment. In this simulation example, the simulation was performed under the conditions shown in FIG. 6.

Figure 7:
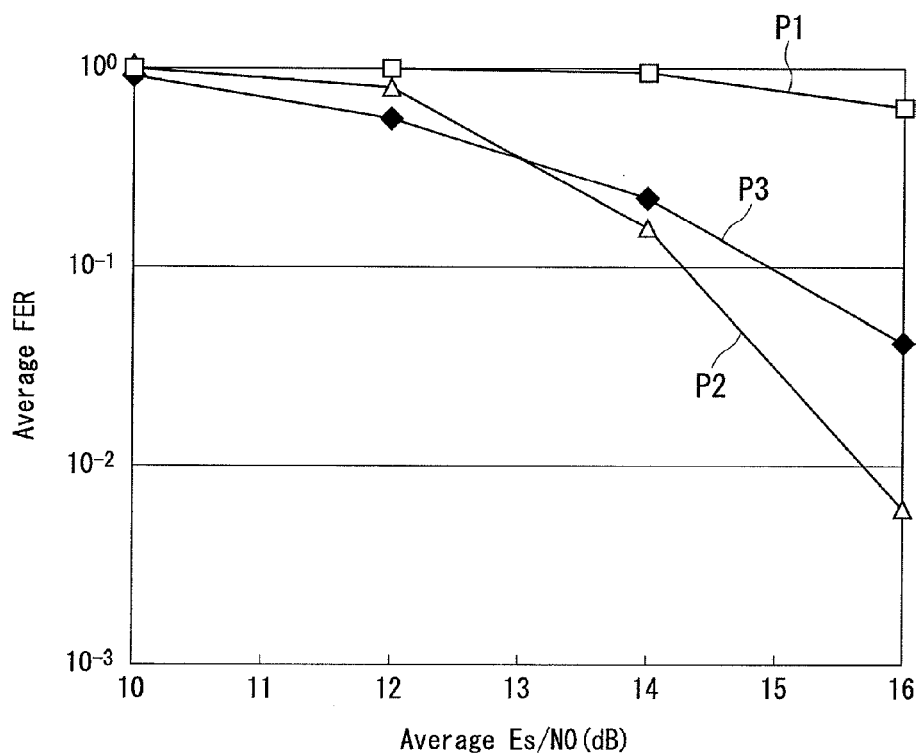
FIG. 7 is a simplified drawing showing an example of the results of simulating in a communication system according to this embodiment.

FIG. 7 is a simplified drawing showing an example of the results of simulation of a communication system according to this embodiment. In this drawing, the horizontal axis is the average Es/No (ratio of average received energy to the noise power density), and the vertical axis is the average frame error rate (FER) performance. This drawing is the result of a simulation for the case of the simulation conditions shown in FIG. 6.

In FIG. 7, the graph marked with the reference symbol P1 shows the performance (called performance 1) in the case of performing only initial processing (not performing iterative processing). The graph marked with the reference symbol P2 shows the performance (called performance 2) of the reception unit b1 according to the present embodiment. The graph marked with the reference symbol P3 shows the performance (called performance 3) for the case of performing only initial processing when there is no variation in the propagation channel (when the maximum Doppler frequency is 0 Hz). Comparing the performance 1 and the performance 2, because the ICI caused by high-speed movement (large propagation channel variation) can be removed, the average FER for the case in which the average Es/No is 16 dB is 0.6 in the former case and, in contrast, 0.006 in the latter case, indicating a great improvement in precision. A comparison of performance 2 and performance 3 also indicates good precision. This is because it is possible to achieve a time diversity effect by variation of the propagation channel.

The above-noted first embodiment was described for the case in which the filter unit b113 generates a received signal replica, the subtraction unit b103 subtracts this received signal replica, the reconstruction unit b107 adds the replica signal of the desired signal, and demodulation processing is performed for each subcarrier. The present invention is not restricted in this manner, however, and the filter unit b113 may generate a signal replica from which the desired received signal of the desired signal, the subtraction unit b103 subtracting this signal replica, and the demodulation processing being performed for each subcarrier.

$$r'_k = r_k - \sum_{d=0}^{D} h'_{d,k} s''_{k-d} \quad (20)$$

$$h'_{d,k} = h_{d,k} - \frac{1}{N} \sum_{k=N_g}^{N+N_g-1} h_{d,k} \quad (21)$$

Additionally, the above-noted first embodiment was described for the case in which the communication system performs multicarrier signal communication. The present invention, however, is not restricted in this manner, and can be applied also to the case in which FFT is used to perform single-carrier signal communication.

Second Embodiment

The second embodiment of the present invention will be described in detail below, with references made to the drawings. In the present embodiment, the reception device is described for the case in which a received signal is demodulated using a signal that, because of propagation channel variation, leaks from the desired subcarrier into another subcarrier.

Because the conceptual diagram of the communication system according to the present embodiment is the same as for the first embodiment (FIG. 1), the description thereof is omitted. In this case, because the transmission device A is the same transmission device a1 as in the first embodiment, the description thereof is omitted. In the description that follows, the reception device B is referred to as the reception device b2.

Figure 8:
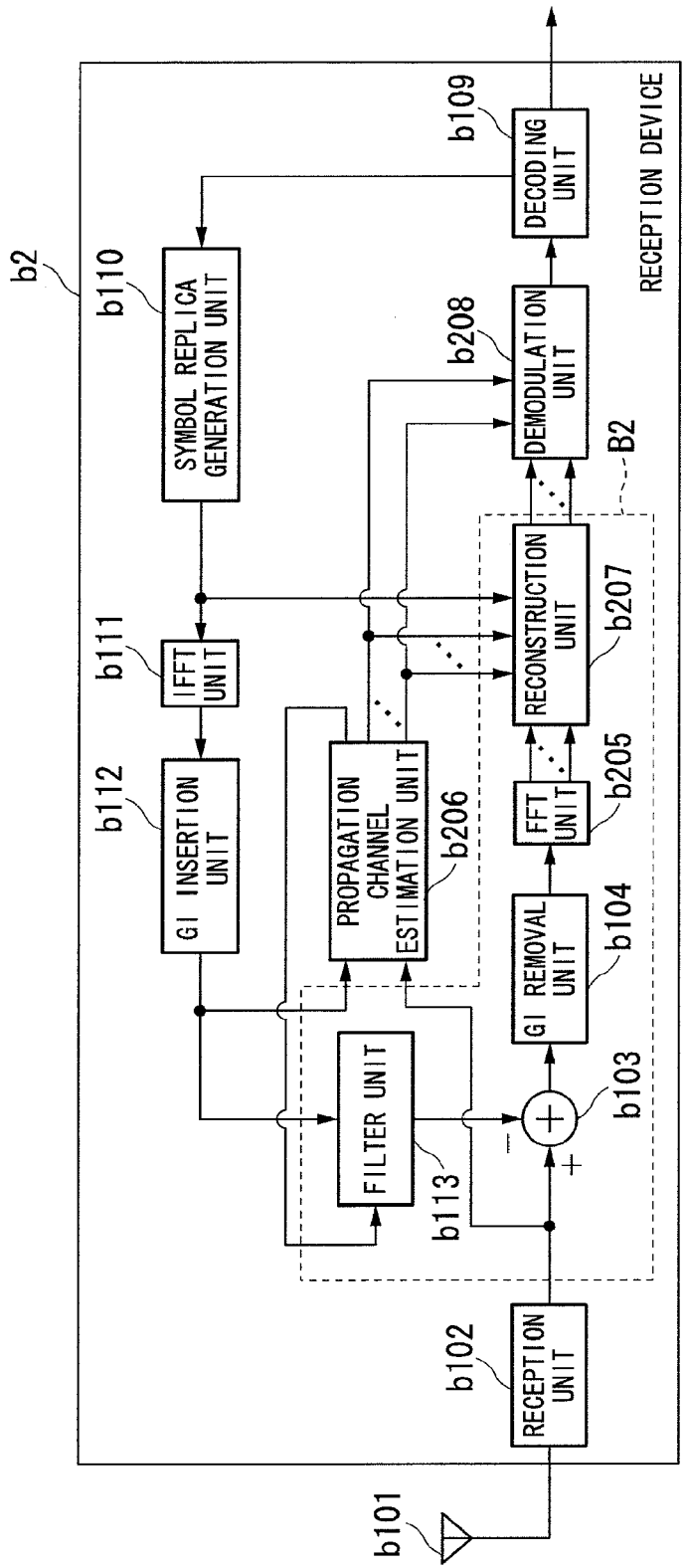
FIG. 8 is a simplified block diagram showing the constitution of a reception device according to a second embodiment of the present invention.

FIG. 8 is a simplified block diagram showing the constitution of a reception device b2 according to the second embodiment of the present invention. In comparison with the reception device b2 (FIG. 8) according to this embodiment and the reception device b1 (FIG. 3) according to the first embodiment, an FFT unit b205, a propagation channel estimation unit b206, a reconstruction unit b207 and a demodulation unit b208 are different. However, the functions of the other constituent elements (the receiving antenna b101, the reception unit b102, the subtraction unit b103, the GI removal unit b104, the decoding unit b109, the symbol replica generation unit b110, the IFFT unit b111, the GI insertion unit b112, and the filter unit b113) are the same as the first embodiment. The descriptions of functions that are the same as in the first embodiment are omitted. The subtraction unit b103, the GI removal unit b104, the FFT unit b205, the reconstruction unit b207 and the filter unit b113 are referred to as a signal extraction unit B2.

The FFT unit b205 performs time-to-frequency transformation of the time-domain signal input from the GI removal unit b104 and outputs the transformed frequency-domain signal to the reconstruction unit b207. At this point, the FFT unit b205 collectively outputs the surrounding (n+1)th subcarrier (l=1, −1, 2, −2, . . . , L, −L) signal with respect to the n-th subcarrier signal of the reconstruction unit b207. The subcarrier number n is a number assigned in the ascending order or descending order of frequency.

The propagation channel estimation unit b206, in addition to the processing of the propagation channel estimation unit b106 according to the first embodiment, also calculates the coefficient of leakage from the n-th subcarrier into the (n+1)th subcarrier, based on the pilot signal. The propagation channel estimation unit b206 outputs the calculated leakage coefficient to the reconstruction unit b207 and the demodulation unit b208.

For each subcarrier, the reconstruction unit b207 multiplies the leakage coefficient input from the propagation channel estimation unit b206 by the symbol replica input from the symbol replica generation unit b110 and generates a replica signal of the desired signal that is leaked from the n-th subcarrier into the (n+1)th subcarrier (called the (n+1)th leaked replica signal). The reconstruction unit b207 adds the generated (n+1)th leaked replica signal to the (n+1)th subcarrier signal input from the FFT unit b205. That is, the reconstruction unit b207 extracts the subcarrier component of the frequency-domain signal transformed by the FFT unit b205, and adds to the extracted signal of the subcarrier component a subcarrier component nearby the subcarrier, which is a subcarrier component of a replica signal of a desired signal.

The reconstruction unit b207 outputs to the demodulation unit b208 the signal to which the (n+1)th leaked replica signal has been added.

The demodulation unit b208 calculates filter coefficients, based on the ZF (zero forcing) criteria, the MMSE criteria, or the like, using the leakage coefficient, the noise power, and the ICI power, which have been input from the propagation channel estimation unit b206. The demodulation unit b208, using the calculated filter coefficients, performs propagation channel compensation. The demodulation unit b208 de-maps the signal that has been propagation channel compensated, based on mapping information that is previously notified from the transmission device a1, and performs demodulation processing of the de-mapped signal. The demodulation unit b208 outputs the bit log-likelihood ratio of the result of the demodulation to the decoding unit b109.

<Operating Principle>

The operating principle of the reception device b2 will be described below, with references made to FIG. 8. Because the operating principle of the initial processing is the same as in the first embodiment, the description thereof is omitted. The operating principle for iterative processing will be described below.

As described with regard to the first embodiment, the signal $R'_n$ of the n-th subcarrier output by the FFT unit b205 is expressed by Equation (15). Therefore, the signal $R'_{n+l}$ of the (n+1)th subcarrier is expressed by the following Equation (22).

$$R'_{n+l} = W_{n+l,n+l}(S_{n+l} - S''_{n+l}) + \sum_{m=0, m\neq n+l}^{N-1} W_{n+l,m}(S_m - S''_m) + Z_{n+l} \quad (22)$$

$$= W_{n+l,n}(S_n - S''_n) + \sum_{m=0, m\neq n}^{N-1} W_{n+l,m}(S_m - S''_m) + Z_{n+l}$$

In Equation (22) modified as shown above, the first term indicates that this is the n-th subcarrier element. The reconstruction unit b207 multiplies the symbol replica $S''_n$ by the frequency response $W_{n+l,n}$, and generates the (n+1)th leakage replica signal $W_{n+l,n}S''_n$. The reconstruction unit b207 adds to the signal $R'_{n+l}$ expressed by Equation (22) the generated (n+1)th leakage replica signal $W_{n+l,n}S''_n$. The signal $X_{n,l}$ after this addition is expressed by the following Equation (23).

$$X_{n,l} = R'_{n+l} + W_{n+l,n}S''_n \quad (23)$$

$$= W_{n+l,n}S_n + \sum_{m=0, m\neq n}^{N-1} W_{n+l,m}(S_m - S''_m) + Z_{n+l}$$

The demodulation unit b108, using Equation (24), calculates the demodulation symbol $S'_n$ of the n-th subcarrier. However, the following Equation (24) is the equation for the case of noise approximating the removal residue and normalizing the demodulation symbol power to 1.

$$S'_n = \frac{\sum_{l=-L}^{L} W^*_{n+l,n} X_{n,l}}{\sum_{L=-L}^{L} W^*_{n+l,n} W_{n+l,n} + \sigma^2_z + \sigma^2_{l'}} \quad (24)$$

In each subcarrier, the signal power leaking in from another subcarrier is reduced, the greater is the difference in frequency. Thus, in the reception device b1, L may be established beforehand and, for example, may be L=±1. That is, this can be a value that takes into consideration only two adjacent subcarriers. As noted above, in the reception device b1, information regarding L subcarriers of larger and smaller frequencies from the n-th subcarrier is used for processing. The present invention, however, is not restricted in this manner, and processing may be performed using a number of subcarriers that differs in the larger and smaller directions in frequency, and processing may be performed using frequencies either only in the larger direction or smaller direction in frequency.

<Operation of the Reception Device b2>

Figure 9:
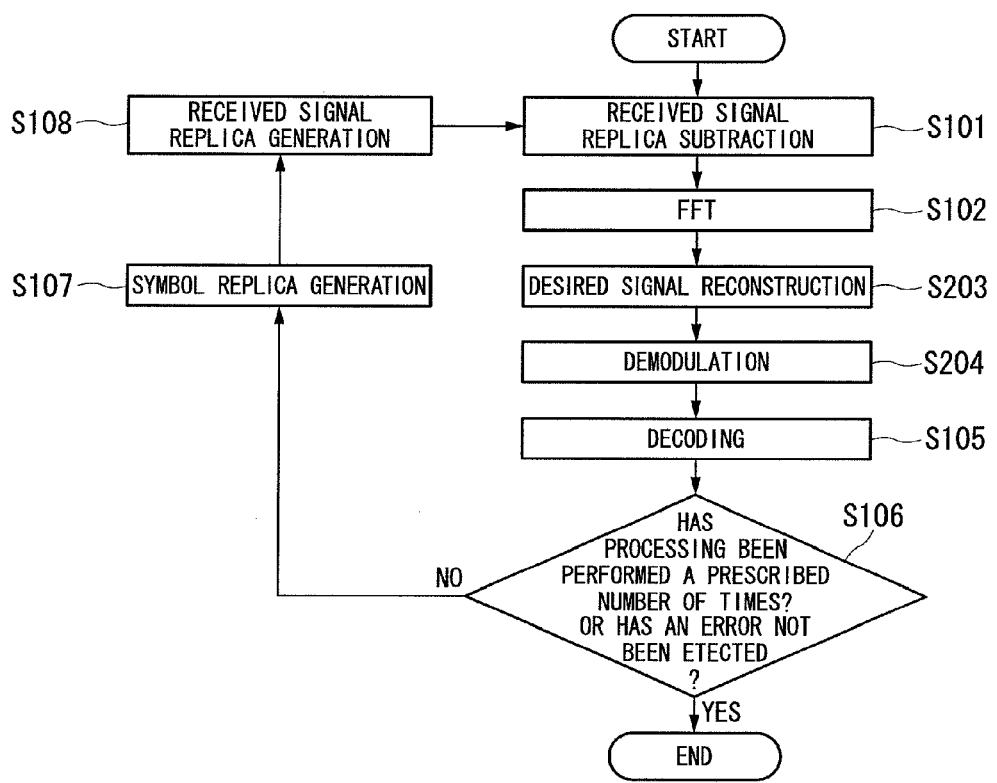
FIG. 9 is a flowchart showing the operation of the reception device according to this embodiment.

FIG. 9 is a flowchart showing the operation of the reception device b2 in the present embodiment. The operation shown in this drawing is processing after the reception device b102 of FIG. 8 outputs the initially received signal to the subtraction unit b103.

Comparing the operation of the reception device b2 (FIG. 9) in the present embodiment with the operation of the reception device b1 (FIG. 5) in the first embodiment, the processing of steps S203 and S204 is different. However, the other processing (processing of steps S101, S102, and S105 to S108) is the same as in the first embodiment. Descriptions of processing that is the same as in the first embodiment are omitted.

(Step 203) The reconstruction unit b207, for each subcarrier, adds to the (n+1)th subcarrier signal resulting from the transformation at step S102, the (n+1)th leakage replica signal that is the symbol replica generated at step S107 multiplied by the leakage coefficient. After that, processing proceeds to step S204.

(Step S204) The demodulation unit b207 compensates the propagation channel and calculates the bit-log likelihood ratio with respect to the signal resulting from the addition at step S203. After that, processing proceeds to step S105.

In this manner, according to the present embodiment the reception device b2 adds to the signal of a subcarrier component a subcarrier component nearby the subcarrier, which is a subcarrier component of a replica signal of a desired signal. By doing this, the reception device b2 can improve the SINR and obtain good transmission performance.

Third Embodiment

The third embodiment of the present invention will be described in detail below, with references being made to the drawings. In the present embodiment, the description is for the case in which communication system performs communication by MIMO (multiple-input, multiple-output) transmission.

Because the conceptual diagram of the communication system according to the present embodiment is the same as for the first embodiment (FIG. 1), the description thereof is omitted. In the description that follows, the transmission device A is referred to as the transmission device a3, and the reception device B is referred to as the reception device b3. Also, in the present embodiment, the description is for the case in which a signal transmitted by a transmission device a3 having T antennas is received by a reception device b3 having R antennas. In this case, the reception device b3 receives T streams transmitted from the transmission device a3 by the T antennas, using the R antennas, and performs MIMO separation thereof.

<Constitution of the Transmission Device a3>

Figure 10:
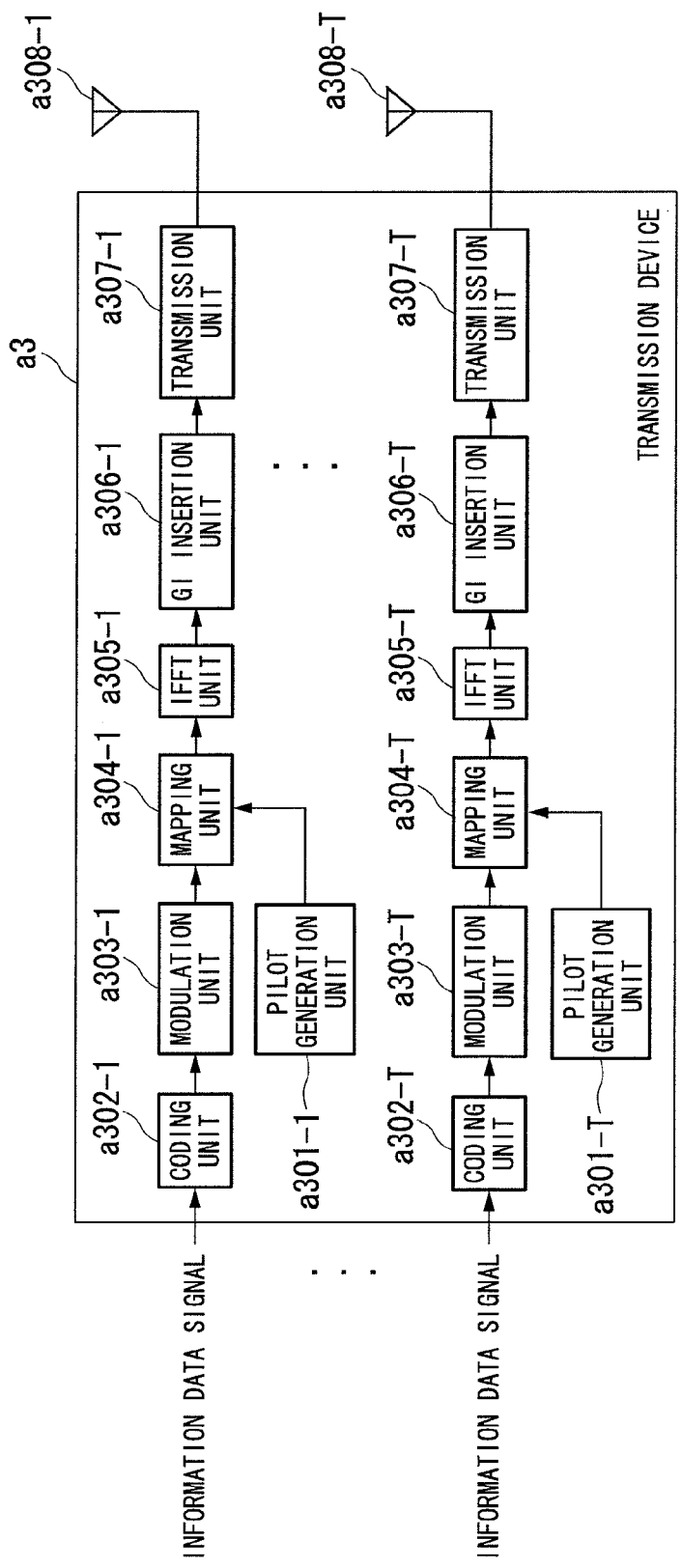
FIG. 10 is a simplified block diagram showing the constitution of a transmission device according to a third embodiment of the present invention.

FIG. 10 is a simplified block diagram showing the constitution of the transmission device a3 according to the third embodiment of the present invention. In this drawing, the transmission device a3 is constituted to include a pilot generation unit a301-$t$ (t=1, 2, . . . T, hereinafter the same), a coding unit a302-$t$, a modulation unit a303-$t$, a mapping unit a304-$t$, an TFFT unit a305-$t$, a GI insertion unit a306-$t$, a transmission unit a307-$t$, and a transmitting antenna a308-$t$.

The pilot generation unit a301-$t$ generates a pilot signal, the amplitude value of the waveform (or signal stream) of which is stored by the reception device b3 beforehand, and outputs it to the mapping unit a304-$t$.

The coding unit a302-$t$ codes the information bits to be transmitted to the reception device b3, using a error correction code such as convolution code, a turbo code, or an LDPC code, and generates coded bits. The coding unit a302-$t$ outputs the generated coded bits to the modulation unit a303-$t$.

The modulation unit a303-$t$ modulates the coded bits input from the coding unit a302-$t$, using a modulation mode such as PSK or QAM, and generates modulation symbols. The modulation unit a303-$t$ outputs the generated modulation symbols to the mapping unit a304-$t$.

The mapping unit a304-$t$ maps the pilot signal input from the pilot generation unit a301-$t$ and the modulation symbols input from the modulation unit a303-$t$, based on pre-established mapping information, onto resources and generates a frequency-domain signal and outputs the generated frequency-domain signal to the IFFT unit a305-$t$. The mapping information is decided by the transmission device a3, and notified beforehand by the transmission device a3 to the reception device b3.

The IFFT unit a305-$t$ performs a frequency-to-time transformation of the frequency-domain signal input from the mapping unit a304-$t$ to generate a time-domain signal. The IFFT unit a305-$t$ outputs the generated time-domain signal to the GI insertion unit a306-$t$.

The GI insertion unit a306-$t$ adds a guard interval to the time-domain signal input from the IFFT unit a305-$t$, for each signal of an FFT duration. In this case, the guard interval is a copy of a part of the end of the signal of an FFT duration, and the GI insertion unit a306-$t$ adds this copied signal to the front of the signal of the FFT duration.

The GI insertion unit a306-$t$ outputs the signal to which the guard interval has been added to the transmission unit a307-$t$.

The transmission unit a307-$t$ performs digital-to-analog conversion of the signal input from the GI insertion unit a306-$t$ and wave-shapes the converted analog signal. The transmission unit a307-$t$ up-converts the wave-shaped signal from the baseband to the wireless frequency band, and transmits it to the reception device b3 from the transmitting antenna a308-$t$.

<Constitution of the Reception Device b3>

Figure 11:
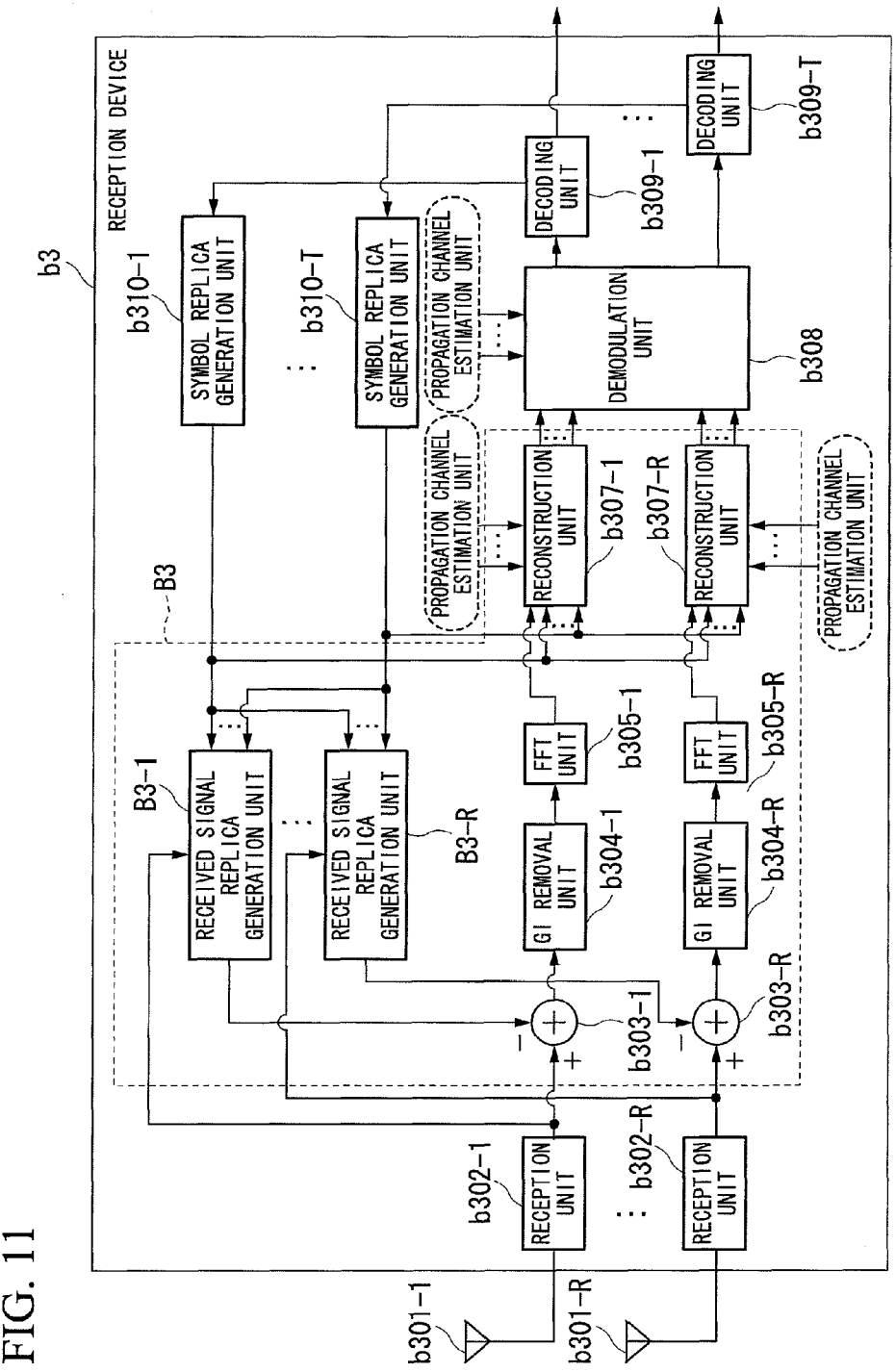
FIG. 11 is a simplified block diagram showing the constitution of the reception device according to this embodiment.

FIG. 11 is a simplified block diagram showing the constitution of the reception device b3 according to the present embodiment.

In this drawing, the reception device b3 is constituted to include a receiving antenna b301-$r$ (r=1, 2, . . . R, hereinafter the same), a reception unit b302-$r$, a subtraction unit b303-$r$, a GI removal unit b304-$r$, an FFT unit b305-$r$, a received signal replica generation unit B3-$r$, a reconstruction unit b307-$r$, a demodulation unit b308, a decoding unit b309-$t$, and a symbol replica generation unit b310-$t$. The subtraction units b303-1 to b303-R, the GI removal units b304-1 to b304-R, the FFT units b305-1 to b305-R, the reconstruction units b307-1 to b307-R, and the received signal replica generation units B3-1 to B3-R (the filter unit b313-1 to b313-R, which will be described later) are called the signal extraction unit B3.

The reception unit b302-$r$ receives the transmitted signal transmitted by the transmission device a3, via the receiving antenna b301-$r$. The reception unit b302-$r$ performs frequency transformation and analog-to-digital conversion of the received signal and stores the converted received signal. The reception unit b302-$r$ outputs the stored received signal to the subtraction unit b303-$r$ and the received signal replica generation unit B3-$r$, at the timing of the initial processing and input of the received signal replica to the subtraction unit b303-$r$ by the filter unit b313-$r$, to be described later.

The subtraction unit b303-$r$ subtracts from the received signal input from the reception unit b302-$r$ the received signal replica input from the received signal replica generation unit B3-$r$, which is described later. The subtraction unit b303-$r$ outputs to the GI removal unit b304-*r* the signal from which the received signal replica has been subtracted.

In the case of the initial processing, there is no (that is, zero) input from the received signal replica generation unit b3-*r* to the subtraction unit b303-*r*, and the subtraction unit b303-*r* outputs the received signal input from the reception unit b302-*r* as is to the GI removal unit b304-*r*.

The GI removal unit b304-*r* removes the GI from the signal input from the subtraction unit b303-*r*, and outputs the signal from which the GI has been removed to the FFT unit b305-*r*.

The FFT unit b305-*r* performs time-to-frequency transformation of the time-domain signal input from the GI removal unit b304-*r*, and outputs the transformed frequency-domain signal to the reconstruction unit b307-*r*.

The received signal replica generation unit B3-*r* estimates the frequency response from each of the antenna a308-*t* (the t-th antenna) of the transmission device a3 to the antenna b301-*r* (r-th antenna), and outputs this to the reconstruction unit b307-*r* and the demodulation unit b308. The received signal replica generation unit B3-*r* also calculates the noise power and the ICI power, and outputs them to the demodulation unit b308.

The received signal replica generation unit B3-*r* generates the received signal replica of the received signal received from the r-th antenna from the symbol replica input from the symbol replica generation unit b310-*t*, and outputs this to the subtraction unit b303-*r*. The details of the constitution and the processing of the received signal replica generation unit B3-*r* will be described later.

The reconstruction unit b307-*r*, for each subcarrier, multiplies the frequency response input from the propagation channel estimation unit b306 by the symbol replica input from the symbol replica generation unit b310-*t*, which is described later, and generates the replica signal of the desired signal that is affected by the propagation channel. The reconstruction unit b307-*r*, for each subcarrier, adds the generated replica signal to the signal input from the FFT unit b305-*r*. That is, the reconstruction unit b307-*r* extracts the subcarrier component of the frequency-domain signal transformed by the FFT unit b305-*r*, and adds the desired stream (t-th stream) of the subcarrier component of the desired replica signal to the signal of the extracted subcarrier component. The reconstruction unit b307-*r* outputs to the demodulation unit b308 the signal to which the replica signal is added.

In the case of initial processing, because there is no (zero) input to the reconstruction unit b307-*r* from the symbol replica generation unit b310-*t*, the symbol replica generation unit b310-*r* outputs the signal input from the FFT unit b305-*r* to the demodulation unit b308 as is.

The demodulation unit b308, using the frequency response, the noise power, and the ICI power input from the propagation channel estimation unit b306-*r*, calculates the filter coefficients using the ZF criteria, the MMSE criteria, or the like. The demodulation unit b308 performs propagation channel compensation using the calculated filter coefficients. The demodulation unit b308, based on the mapping information notified from the transmission device a3, de-maps the propagation channel compensated signal and performs demodulation processing of the de-mapped signal. The demodulation unit b309-*t*, with regard to the transmitted signal stream (called the t-th stream) transmitted from the t-th antenna, outputs the bit-log likelihood ratio of the demodulation result to the decoding unit b309-*t*.

The decoding unit b309-*t*, with respect to the demodulation symbol input from the demodulation unit b308, performs decoding processing, using maximum likelihood decoding, maximum a posteriori probability estimation, log-MAP, Max-log-MAP, SOYA, or the like.

As the result of the decoding processing, if the determination is made that an error is not detected, or that processing has been performed a prescribed number of times, the decoding unit b309-*t* outputs the bit log-likelihood ratio of the result of decoding, as information data bit. However, if the determination is made that an error is detected and also that the processing has not been performed the prescribed number of times, the decoding unit b309-*t* outputs the bit log-likelihood ratio of the result of decoding to the symbol replica generation unit b310-*t*.

The symbol replica generation unit b310-*t* calculates the expected value of the bit log-likelihood ratio input from the decoding unit b309-*t*, decodes and modulates the calculated expected value and generates a symbol replica. The symbol replica generation unit b310-*t* maps the generated symbol replica based on the mapping information that was notified from the transmission device a3 beforehand. The symbol replica generation unit b310 outputs the mapped symbol replica to the reconstruction units b307-1 to b307-R and to the received signal replica generation units B3-1 to B3-R.

Figure 12:
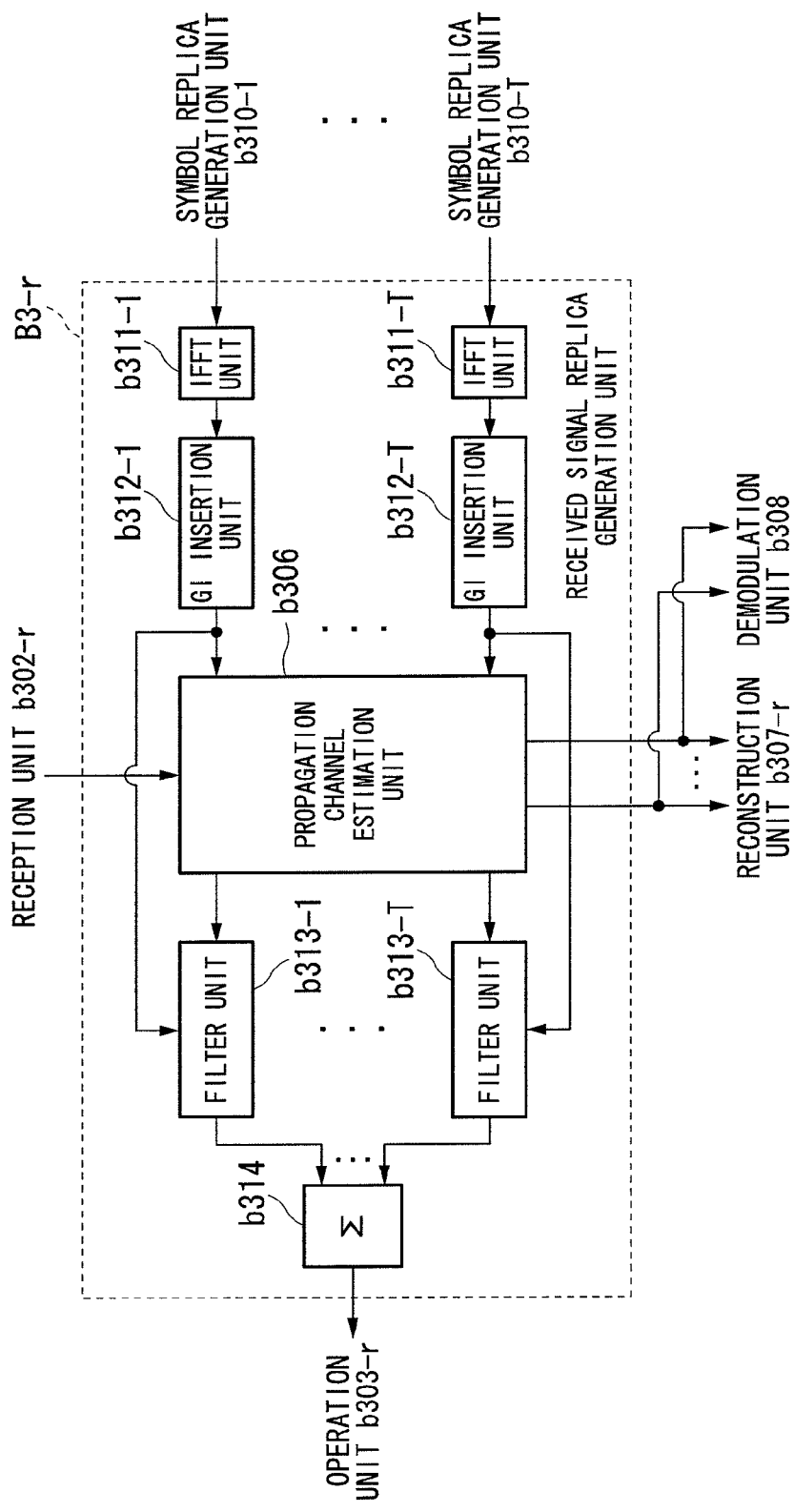
FIG. 12 is a simplified block diagram showing the constitution of the received signal replica generation unit according to this embodiment.

FIG. 12 is a simplified block diagram showing the constitution of the received signal replica generation unit B3-*r* according to the present embodiment. In this drawing, the received signal replica generation unit b3-*r* is constituted by an IFFT unit b311-*r*, a GI insertion unit b312-*t*, a propagation channel estimation unit b306, a filter unit b313-*t*, and a summing unit b314.

The IFFT unit b311-*t* performs frequency-to-time transformation of the symbol replica input from the symbol replica generation unit b310-*t* and outputs the transformed time-domain replica signal to the GI insertion unit b312-*t*.

The GI insertion unit b312-*t* adds a guard interval to the replica signal input from the IFFT unit b311-*t* and generates a transmitted signal replica for each signal of an FFT duration. The GI insertion unit b312-*t* outputs the generated transmitted signal replica to the propagation channel estimation unit b306*b* and the filter unit b313-*t*.

The propagation channel estimation unit b306, based on the received signal input from the reception unit b302-*r* and the transmitted signal replica signal input from the GI insertion unit b312-*t*, estimates, in the OFDM symbol duration, the channel impulse response of the propagation channel from the t-th antenna to the r-th antenna. In the case of initial processing, there is no (that is, zero) input from the GI insertion unit b312-*t* to the propagation channel estimation unit b306, and the propagation channel estimation unit b306 estimates the channel impulse response that varies with time in the OFDM symbol duration, based on the previously stored pilot signal, and the received signal input from the reception unit b302-*r*.

The propagation channel estimation unit b306 outputs the estimated channel impulse response to the filter unit b313-*t*. The propagation channel estimation unit b306 also performs time-to-frequency transformation of the estimated channel impulse response and outputs the frequency response, which is the transformed frequency-domain signal, to the reconstruction unit b307-*r* and the demodulation unit b308.

The propagation channel estimation unit b306 also generates a replica of the pilot signal from estimated frequency response and the previously stored pilot signal. The propagation channel estimation unit b306 calculates the noise power, based on the pilot signal of the received signal and on the generated replica of the pilot signal. The propagation channel estimation unit b306 also calculates the ICI power, based on the estimated frequency response and the pilot signal. The details of the processing performed by the propagation channel estimation unit b306 to calculate the noise power and the ICI power will be described later, together with the operating principle. The propagation channel estimation unit b306 outputs the calculated noise power and ICI power to the demodulation unit b308.

The filter unit b313-t generates the received signal replica of the t-th stream received at the r-th antenna, based on the channel impulse response input from the propagation channel estimation unit b306 and the transmitted signal replica input from the GI insertion unit b312-t. The filter unit b313-t outputs the generated received signal replica to the synthesis unit b314.

The synthesis unit b314 synthesizes the received signal replica input from the filter unit b313-t, generates the received signal replica of the received signal received by the r-th antenna, and outputs the generated received signal to the subtraction unit b303-r.

<Operating Principle>

The operating principle of the reception device b3 will be described below, with references made to FIG. 11 and FIG. 12. The k-th discrete time received signal $r_{k,r}$ received by the reception device b302-r is expressed by the following Equations (25) and (26).

$$r_{k,r} = \sum_{t=1}^{T}\sum_{d=0}^{D} h_{d,k,r,t} s_{k-d,t} + z_{k,r} \tag{25}$$

$$s_{k,t} = \frac{1}{\sqrt{N}} \sum_{n=0}^{N-1} S_{n,t} \exp\left[j\frac{2\pi n}{N}(k - N_g)\right] \tag{26}$$

In the above, T is the antenna number of the transmission device a3, D is the maximum propagation channel number, $h_{d,k,r,t}$ is the complex amplitude at the k-th discrete time on the d-th path from the t-th antenna to the r-th antenna, $S_{k,t}$ is the time-domain transmitted signal of the t-th stream, and $z_{k,r}$ is the time-domain noise at the r-th antenna.

Additionally, N is the number of points in an FFT duration, $S_{n,t}$ is the n-th subcarrier modulation signal of the t-th stream, $N_g$ is the number of points in the GI duration, and j is the unit of an imaginary number.

The subtraction unit b303-r subtracts the received signal replica from the signal $r_{k,r}$ that is expressed by Equation (25). The GI removal unit b304-r removes the GI from the signal of the FFT duration of the subtraction result, and the FFT unit b305-r performs a time-to-frequency transformation on the signal from which the GI has been removed. The signal output by the FFT unit b305-r is expressed by the following Equations (27) and (28).

$$R'_{n,r} = \sum_{t=1}^{T}\sum_{m=0}^{N-1} W_{n,m,r,t}(S_{m,t} - S''_{m,t}) + Z_{n,r} \tag{27}$$

$$W_{n,m,r,t} = \tag{28}$$

$$\frac{1}{N}\sum_{d=0}^{D}\sum_{k=N_g}^{N_g+N-1} h_{d,k,r,t}\exp\left[-j\frac{2\pi(n-m)}{N}(k-N_g)\right]\exp\left(-j\frac{2\pi n}{N}d\right)$$

In this case, $W_{n,m,r,t}$ is the leakage coefficient of a signal from the m-th subcarrier to the n-th subcarrier with regard to the t-th stream received by the r-th antenna, and the leakage coefficient for the case in which m=n is the frequency response. Additionally, $S''_{m,t}$ is the symbol replica for the signal of the n-th subcarrier of the t-th stream.

The reconstruction unit b307-r multiplies the symbol replica $S''_{n,t}$ by the frequency response $W_{n,n,r,t}$ input from the propagation channel estimation unit b306, and generates a replica signal $W_{n,n,r,t}S''_{n,t}$ of the desired signal with regard to the n-th subcarrier of the t-th stream received by the r-th antenna, which is affected by the propagation channel. The reconstruction unit b307-r adds the generated replica signal $W_{n,n,r,t}S''_{m,t}$ to the signal $R'_{n,r}$ that is expressed by Equation (27). That is, the reconstruction unit b307-r extracts the subcarrier component of the frequency-domain signal transformed by the FFT unit b305-r, and adds to the signal of the extracted subcarrier component a desired stream component of the subcarrier component of a replica signal of the desired signal. The signal $Y_{n,r,t}$ after this addition is expressed by the following Equation (29).

$$Y_{n,r,t} = R'_{n,r} + W_{n,n,r,t}S''_{n,t} \tag{29}$$

$$= W_{n,n,r,t}S_{n,t} + \sum_{u=1}^{T}\sum_{m=0,m\neq n}^{N-1} W_{n,m,r,u}(S_{m,u} - S''_{m,u}) +$$

$$\sum_{u=0,u\neq t}^{T} W_{n,n,r,u}(S_{n,u} - S''_{n,u}) + Z_{n,r}$$

In this case, because the third term of Equation (29) indicates that the signal for another stream is removed, Equation (29) means that MIMO separation is done.

The demodulation unit b308, using the following Equation (30), calculates the demodulation symbol of the n-th subcarrier of the t-th stream. However, Equation (30) is the equation for the case of noise approximating the removal residue and of normalizing the demodulation symbol power to 1.

$$S''_{n,t} = \frac{\sum_{r=1}^{R} W^*_{n,n,r,t} Y_{n,r,t}}{\sum_{r=1}^{R} W^*_{n,n,r,t} W_{n,n,r,t} + \sigma^2_z + \sigma^2_{I'}} \tag{30}$$

<Operation of the Reception Device b3>

Figure 13:
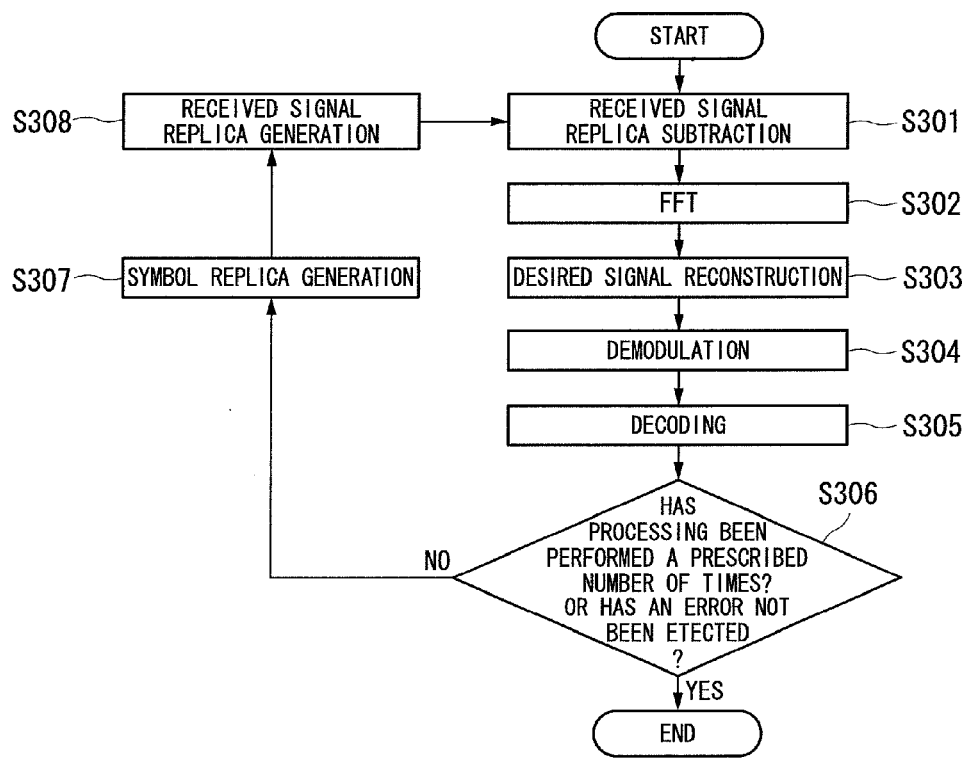
FIG. 13 is a flowchart showing the operation of the reception device according to this embodiment.

FIG. 13 is a flowchart showing the operation of the reception device b3 in the present embodiment. The operation shown in this drawing is the processing after the reception unit b302-r outputs the initially received signal to the subtraction unit b303-r.

(Step S301) The subtraction unit b303-r subtracts the received signal replica input at step S308, which is described later, from the received signal. After that, processing proceeds to step S302.

(Step S302) The FFT unit b305 performs a time-to-frequency transformation with respect to the signal resulting from the subtraction at step S301. After that, processing proceeds to step S303.

(Step S303) The reconstruction unit b307-r, for each subcarrier, adds to the signal resulting from the transformation at step S302 a replica signal that is the symbol replica generated at step S307, which is described below, multiplied by the frequency response. After that, processing proceeds to step S304.

(Step S304) The demodulation unit b308 compensates the propagation channel and calculates the bit-log likelihood ratio with respect to the signal resulting from the addition at step S303. After that, processing proceeds to step S305.

(Step S305) The decoding unit b309-*t* performs decoding processing, such as error correction, with respect to the bit-log likelihood ratio resulting from the calculation at step S304. After that, processing proceeds to step S306.

(Step S306) The decoding unit b309-*t* determines whether an error is not detected in the decoding results from step S305 or whether processing has been performed a prescribed number of times, In either case (Yes), the reception device b3 stops operation. However, if neither of these conditions has occurred (No), processing proceeds to step S307.

(Step S307) The symbol replica generation unit b310-*t* generates a symbol replica from the bit-log likelihood ratio of the decoding results at step S305. After that, processing proceeds to step S308.

(Step S308) The received signal replica generation unit B3-*r* generates a received signal replica, based on the symbol replica generated at step S307. After that, processing proceeds to step S301.

In this manner, according to the present embodiment, the reception device b3 extracts each subcarrier component of the received signal from which the delayed signal has been removed, and demodulates the signals of each extracted subcarrier component. By doing this, the reception device b3 can prevent an increase in the amount of calculation even in the case of MIMO transmission.

Although in the above-noted third embodiment the reception device b3 does not reconstruct the signal on another stream, even in the case of the desired subcarrier, it may reconstruct the signal on another stream. That is, the third term of Equation (29) may be reconstructed. In this case, the demodulation unit performs MIMO separation and can perform not only linear processing such as ZF or MMSE, but also non-linear processing, such as maximum likelihood detection (MLD, used below as the abbreviation meaning maximum likelihood detection).

The principle of the calculation processing for bit-log likelihood ratio, which is performed by the reception unit b3 using MLD, will be described below for the case of also reconstructing the signal of another stream.

The reconstruction unit b307-*r* adds to the signal $R'_{n,r}$ expressed by Equation (27) the extracted replica signal $W_{n,n,r,t}S''_{m,t}$ for all values of t. That is, the reconstruction unit b307-*r* extracts the subcarrier component of the frequency-domain signal transformed by the FFT unit b305-*r*, and adds to the signal of the extracted subcarrier component all the stream components of the subcarrier components of the replica signal of the desired signal. The signal $Y_{n,r,t}$ after this addition is expressed by the following Equations (31) and (32).

$$Y_{n,r} = R'_{n,r} + \sum_{t=1}^{T} W_{n,n,r,t}S''_{n,t} \quad (31)$$

$$= \sum_{t=1}^{T} W_{n,n,r,t}S_{n,t} + \sum_{u=1}^{T}\sum_{m=0,m\neq n}^{N-1} W_{n,m,r,u}(S_{m,u} - S''_{m,u}) + Z_{n,r}$$

$$= \sum_{t=0}^{T-1} W_{n,n,r,t}S_{n,t} + Z'_{n,r}$$

$$Z'_{n,r} = \sum_{u=1}^{T}\sum_{m=0,m\neq n}^{N-1} W_{n,m,r,u}(S_{m,u} - S''_{m,u}) + Z_{n,r} \quad (32)$$

These Equations (31) and (32) are expressed as spectrum notation by the following Equations (33) to (36).

$$Y_n = (Y_{n,1} \ldots Y_{n,R})^T \quad (33)$$
$$= H_nS_n + Z_n$$

$$H_n = \begin{pmatrix} W_{n,n,1,1} & \ldots & W_{n,n,1,T} \\ \vdots & \ddots & \vdots \\ W_{n,n,R,1} & \ldots & W_{n,n,R,T} \end{pmatrix} \quad (34)$$

$$S_n = (S_{n,1} \ldots S_{n,T})^T \quad (35)$$

$$Z_n = (Z'_{n-1} \ldots Z'_{n,R})^T \quad (36)$$

In this case, the bit stream β of the vector $S_n$ of Equation (35) is expressed by the following Equation (37).

$$\beta = [b_{1,0} \ldots b_{1,M-1} \ldots b_{T,M-1}] \quad (37)$$

In the above, M is the number of modulation levels. For example, in the case of QPSK M=2, and in the case of 16QAM M=4. The bit-log likelihood ratio $\lambda(b_{t,q})$ of the bit $b_{t,q}$ in Equation (37) is expressed by the following Equation (38).

$$\lambda(b_{t,q}) = \log\frac{p(b_{t,q}=0|R_n)}{p(b_{t,q}=1|R_n)} \quad (38)$$

$$= \log\frac{\sum_{\beta,b_{t,q}=0} p(\beta|R_n)}{\sum_{\beta,b_{t,q}=1} p(\beta|R_n)}$$

p(A|B) expresses the conditional probability of A in B.

$\Sigma_{\beta,b_{t,q}=0} p(\beta|R_n)$ is the expression of the sum of the cases in which $b_{t,q}$ only is 0 and other bits are 0 and 1.

In this case, using Bayes' Theorem, p(A|B) p(B)=p(B|A) p(A), the bit-log likelihood ratio $\lambda(b_{t,q})$ of Equation (38) is expressed by the following Equation (39).

$$\lambda(b_{t,q}) = \log\frac{\sum_{\beta,b_{t,q}=0} p(R_n|\beta)p(\beta)}{\sum_{\beta,b_{t,q}=1} p(R_n|\beta)p(\beta)} \quad (39)$$

Under the hypothesis that $Z'_{n,r}$ conforms to a Gaussian process, using the Max-log approximation, the bit-log likelihood ratio $\lambda(b_{t,q})$ of Equation (39) is expressed by the following Equation (40).

$$\lambda(b_{t,q}) = \max_{\beta,b_{t,q}=0}\left[\frac{1}{\sigma_{Z'}^2}(-\|R_n - H_nS_n\|^2) + \log p(\beta)\right] - \quad (40)$$

-continued $$\max_{\beta, b_{t,q}=1} \left[ \frac{1}{\sigma_{z'}^2} (-\|R_n - H_n S_n\|^2) + \log p(\beta) \right]$$

If each of the bits is assumed to be independent, the p(β) in Equation (40) is expressed by the following Equation (41).

$$p(\beta) = \prod_{t',q',t' \neq t,q' \neq q} p(b_{t',q'}) \qquad (41)$$

In this case, $p(b_{t',q'})$ can be calculated by the bit-log likelihood ratio $\lambda_a(b_{t',q'})$ output by the decoding unit b309-t'. Because the bit-log likelihood ratio $\lambda(b_{t,q})$ obtained in this manner is calculated using the bit-log likelihood ratio $\lambda_a$ $(b_{t,q})$, that component is generally subtracted. That is, the value that the demodulation unit b308 outputs to the decoding unit b309-t is $\lambda(b_{t,q})-\lambda_a(b_{t,q})$.

Because this is simple, the LLR may be calculated with the assumption that there is no prior information. In this case, the bit-log likelihood ratio $\lambda(b_{t,q})$ is expressed by the following Equation (42).

$$\lambda(b_{t,q}) = \qquad (42)$$

$$\max_{\beta, b_{t,q}=0} \left[ \frac{1}{\sigma_{z'}^2} (-\|R_n - H_n S_n\|^2) \right] - \max_{\beta, b_{t,q}=1} \left[ \frac{1}{\sigma_{z'}^2} (-\|R_n - H_n S_n\|^2) \right]$$

The demodulation unit b308, calculates the bit-log likelihood ratio $\lambda(b_{t,q})$ of the result of the demodulation processing using Equation (42), and outputs it to the decoding unit b109-t.

Also, in the above-described third embodiment, similar to the second embodiment, the received signal may be demodulated using the signal leaking from the desired subcarrier to another subcarrier.

In the above-described third embodiment, although the transmission device a3 (FIG. 10) has one encoding unit a302-t with respect to one antenna a308-t, the present invention is not restricted to this, and one encoding unit may be provided for a plurality of antennas. For example, the transmission device b3 may have one encoding unit, and the result of error correction encoding may be distributed among modulation units a303-1 to a303-T, in accordance with a pre-established pattern.

In the above-noted third embodiment, the same information data signal stream transmitted signal may be included in the 1st to the T-th stream, and all different information data signal stream transmitted signals may be included therein. For example, in the case of transmitting two information data signal streams, the transmission device a3 may transmit one information data signal stream as the 1st and 2nd streams and the other information data signal stream as the 3rd and 4th streams.

Using computer, a part of the reception devices b1, b2, and b3 in the above described embodiment, for example, the reception units b102, b302-r, the subtraction units b103, b303-r, the GI removal units b104, b304-r, the FFT units b105, b205, b305-r, the propagation channel estimation units b106, b206, b306, the reconstruction units b107, b207, b307-r, the demodulation units b108, b208, b308, the decoding units b109, b309-t, the symbol replica generation units b110, b310-t, the IFFT units b111, b311-t, the GI insertion units b112, b312-t, the filter units b113, b313-t, and the synthesis unit b314 may implemented. When doing this, a program for implementing this controlling function may be recorded into a computer-readable storage medium, and a computer system may be caused to read in and execute the program recorded in this storage medium. In this case, the term "computer system" is a computer system built into the reception devices b1, b2, b3, and encompasses an operating system and hardware such as peripheral devices. The "computer-readable storage medium" refers to a portable medium such as flexible disk, a magneto-optical disk, a ROM, a CD-ROM or the like, and a storage apparatus such as a hard disk or the like which is built into a computer system. Additionally, the term "computer-readable recording medium" used herein may include ones that dynamically hold a program for a short period of time, such as a communication line in the case in which a program is transmitted via a network such as the Internet, or a telephone line, in which case ones in which a program is held for a certain time, such as in a volatile memory within a computer system that functions as a server or client are included. The above-noted program may be one for implementing a part of the above-noted functions, or one that implements the above-noted functions when used in combination with a program that is already recorded in a computer system.

Although the above has been a description of an embodiment of the present invention, with references made to the drawings, the specific configuration thereof is not restricted to the above description, and it is possible to perform various design changes within a scope that does not go beyond the essence of the present invention.

INDUSTRIAL APPLICABILITY

The present invention is suitable for use in reception of wireless communication.

REFERENCE SYMBOLS

A, a1, a3: Transmission device
B, b1, b2, b3: Reception device
a101, a301-t: Pilot generation unit
a102, a302-t: Coding unit
a103, a303-t: Modulation unit
a104, a304-t: Mapping unit
a105, a305-t: IFFT unit
a106, a306-t: GI insertion unit
a107, a307-t: Transmission unit
a108, a308-t: Transmitting antenna
b101, b301-r: Receiving antenna
b102, b302-r: Reception unit
b103, b303-r: Subtraction unit
b104, b304-r: GI removal unit
b105, b205, b305-r: FFT unit
b106, b206, b306: Propagation channel estimation unit
b107, b207, b307-r: Reconstruction unit
b108, b208, b308: Demodulation unit
b109, b309-t: Decoding unit
b110, b310-t: Symbol replica generation unit
b111, b311-t: IFFT unit
b112, b312-t: GI insertion unit
a113, b313-t: Filter unit
B3-r: Reception signal replica generation unit
b314: Synthesis unit

The invention claimed is:

1. A reception device which demodulates information from a received signal; the reception device comprising:
  a propagation channel estimation unit configured to estimate channel impulse responses at a plurality of times in an Orthogonal Frequency Division Multiplexing (OFDM) symbol, and estimate a frequency response based on the channel impulse responses at the plurality of times;
a symbol replica generation unit configured to generate a symbol replica which is a modulated symbol from a demodulated information;
a filter unit configured to generate a received signal replica which is a replica of the received signal in a time domain, based on the channel impulse responses at the plurality of times and the symbol replica;
a subtraction unit configured to subtract the received signal replica from the received signal;
a time-to-frequency transformation unit configured to convert a signal obtained based on the signal subtracted by the subtraction unit into a frequency-domain signal;
a reconstruction unit configured to generate a replica signal of a desired signal, based on the frequency response and the symbol replica, add the replica signal of the desired signal with respect to the frequency-domain signal converted by the time-to-frequency transformation unit, and extract each of subcarrier components from the received signal; and
a demodulation unit configured to demodulate a signal of the each of the subcarrier components extracted by the reconstruction unit.

2. The reception device according to claim 1, wherein
the propagation channel estimation unit is configured to take the time average of the channel impulse responses at the plurality of times, and estimate the frequency response by performing a time-to-frequency transformation to the result of the time average.

3. The reception device according to claim 1, wherein
the propagation channel estimation unit is configured to estimate the frequency response by performing a time-to-frequency transformation to a channel impulse response at a time in an OFDM symbol duration, the channel impulse response being included in the channel impulse responses.

4. The reception device according to claim 3, wherein
the channel impulse response at the time is at the center of the OFDM symbol duration.

5. The reception device according to claim 2, wherein
the reconstruction unit is configured to extract the subcarrier components of the frequency-domain signal converted by the time-to-frequency transformation unit, and add to the extracted subcarrier components a subcarrier component of the replica signal of the desired signal, the subcarrier component being a component of an adjacent subcarrier.

6. The reception device according to claim 1, wherein
the reception device is configured to receive a signal stream as the received signal transmitted from each of a plurality of antennas provided in a transmission device,
the reconstruction unit is configured to extract the subcarrier components from the frequency-domain signal converted by the time-to-frequency transformation unit, and add to the extracted subcarrier components desired stream components of the subcarrier components of the replica signal of the desired signal, and
the demodulation unit is configured to perform a MIMO separation based on a signal added by the reconstruction unit.

7. The reception device according to claim 1, wherein
the reception device is configured to receive a signal stream as the received signal transmitted from each of a plurality of antennas provided in a transmission device,
the reconstruction unit is configured to extract the subcarrier components from the frequency-domain signal converted by the time-to-frequency transformation unit, and add to the extracted subcarrier components all stream components of the subcarrier components of the replica signal of the desired signal,
the demodulation unit is configured to perform a MIMO separation based on a signal added by the reconstruction unit.

8. The reception device according to claim 1, wherein the demodulation unit is configured to demodulate the signal using a minimum mean square error criteria.

9. The reception device according to claim 3, wherein
the reconstruction unit is configured to extract the subcarrier components of the frequency-domain signal converted by the time-to-frequency transformation unit, and add to the extracted subcarrier components a subcarrier component of the replica signal of the desired signal, the subcarrier component being a component of an adjacent subcarrier.

10. A method for receiving in a reception device which demodulates information from a received signal; the method comprising:
estimating channel impulse responses at a plurality of times in an Orthogonal Frequency Division Multiplexing (OFDM) symbol, and estimating a frequency response based on the channel impulse responses at the plurality of times;
generating a symbol replica which is a modulated symbol from a demodulated information;
generating a received signal replica which is a replica of the received signal in a time domain, based on the channel impulse responses at the plurality of times and the symbol replica;
subtracting the received signal replica from the received signal;
converting a signal obtained from the subtracted signal into a frequency-domain signal;
generating a replica signal of a desired signal, based on the frequency response and the symbol replica, adding the replica signal of desired signal with respect to the converted frequency-domain signal, and extracting each of subcarrier components from the received signal; and
demodulating a signal of the each of the extracted subcarrier components.

11. A non-transitory computer-readable recording medium storing a reception program causing a computer of a reception device which demodulates information from a received signal to execute:
estimating channel impulse responses at a plurality of times in an Orthogonal Frequency Division Multiplexing (OFDM) symbol, and estimating a frequency response based on the channel impulse responses at the plurality of times;
generating a symbol replica which is a modulated symbol from a demodulated information;
generating a received signal replica which is a replica of the received signal in a time domain, based on the channel impulse responses at the plurality of times and the symbol replica;
subtracting the received signal replica from the received signal;
converting a signal obtained from the subtracted signal into a frequency-domain signal;
generating a replica signal of a desired signal, based on the frequency response and the symbol replica, adding the replica signal of the desired signal with respect to the converted frequency-domain signal, and extracting each of subcarrier components from the received signal; and demodulating a signal of the each of the extracted subcarrier components.

* * * * *